United States Patent
Choi et al.

(10) Patent No.: US 12,395,759 B2
(45) Date of Patent: Aug. 19, 2025

(54) IMAGE SENSOR, CAMERA MODULE INCLUDING IMAGE SENSOR, AND OPERATING METHOD OF IMAGE SENSOR

(71) Applicant: Samsung Electronics Co., Ltd., Suwon-si (KR)

(72) Inventors: Shinyeol Choi, Suwon-si (KR); Kyung-Min Kim, Suwon-si (KR); Hoyong Na, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 240 days.

(21) Appl. No.: 18/318,994

(22) Filed: May 17, 2023

(65) Prior Publication Data

US 2024/0064434 A1    Feb. 22, 2024

(30) Foreign Application Priority Data

Aug. 18, 2022  (KR) .................. 10-2022-0103624
Nov. 3, 2022   (KR) .................. 10-2022-0145444

(51) Int. Cl.
*H04N 25/77*   (2023.01)
*H04N 25/62*   (2023.01)
*H04N 25/78*   (2023.01)

(52) U.S. Cl.
CPC ............ *H04N 25/77* (2023.01); *H04N 25/62* (2023.01); *H04N 25/78* (2023.01)

(58) Field of Classification Search
CPC ........ H04N 25/77; H04N 25/62; H04N 25/78; H04N 25/628; H04N 25/59; H04N 25/771; H04N 25/618
See application file for complete search history.

(56) References Cited

U.S. PATENT DOCUMENTS

| | | |
|---|---|---|
| 7,408,577 B2 | 8/2008 | Nakamura et al. |
| 7,477,298 B2 | 1/2009 | Lee et al. |
| 8,314,869 B2 | 11/2012 | Zheng et al. |
| 10,356,350 B2 | 7/2019 | Guidash et al. |
| 10,666,883 B2 | 5/2020 | Kim et al. |
| 10,951,849 B2 | 3/2021 | Liu |
| 11,233,962 B2 | 1/2022 | Jung et al. |
| 11,323,639 B2 | 5/2022 | Cho et al. |

(Continued)

FOREIGN PATENT DOCUMENTS

| | | | | |
|---|---|---|---|---|
| CN | 115514905 A | * | 12/2022 | ....... H01L 27/14612 |
| KR | 100741734 B1 | | 7/2007 | |

*Primary Examiner* — Lin Ye
*Assistant Examiner* — Steven Daniel Barry
(74) *Attorney, Agent, or Firm* — Harness, Dickey & Pierce, P.L.C.

(57) ABSTRACT

An image sensor includes a pixel array that includes a plurality of pixels, and a row driver. Each pixel includes a photodiode, a transfer gate transistor between the photodiode and a floating diffusion node, and a first transistor between the floating diffusion node and a first voltage node configured to receive a first voltage. The row driver is connected with rows of the pixels through row lines. For each pixel of a selected row among the rows, the row driver is configured to apply a second voltage to a gate of the first transistor such that the first transistor is turned on and the floating diffusion node is reset, and turn on the transfer gate transistor such that electrons integrated in the photodiode are dumped to the floating diffusion node.

20 Claims, 17 Drawing Sheets

(56) References Cited

U.S. PATENT DOCUMENTS

| | | | |
|---|---|---|---|
| 11,722,794 B2* | 8/2023 | Innocent | H04N 25/57 |
| | | | 348/302 |
| 2023/0076177 A1* | 3/2023 | Lim | H10F 39/80373 |
| 2024/0129649 A1* | 4/2024 | Kim | H04N 25/77 |

* cited by examiner

IMAGE SENSOR, CAMERA MODULE INCLUDING IMAGE SENSOR, AND OPERATING METHOD OF IMAGE SENSOR

CROSS-REFERENCE TO RELATED APPLICATIONS

This application claims priority under 35 U.S.C. § 119 to Korean Patent Application No. 10-2022-0103624, filed on Aug. 18, 2022 in the Korean Intellectual Property Office, and Korean Patent Application No. 10-2022-0145444, filed on Nov. 3, 2022 in the Korean Intellectual Property Office, the disclosures of each of which are incorporated by reference herein in their entireties.

BACKGROUND

Example embodiments of the present inventive concepts described herein relate to electronic devices, and more particularly, relate to image sensors configured to reduce, minimize, or prevent occurrence of a band noise in image data, camera modules including one or more of such image sensors, and operating methods of such image sensors.

An image sensor is mounted in various types of electronic devices. For example, an electronic device that includes the image sensor may be included as components of various types of electronic devices such as a smartphone, a tablet personal computer (PC), a laptop PC, and a wearable device.

An image sensor may obtain image information about (e.g., associated with) an external object by converting a light reflected from the external object into an electrical signal. An electronic device including the image sensor may display an image in a display panel by using the obtained image information.

The image sensor may include a plurality of pixels. Each of the plurality of pixels may include a photo detector that generates electrons in response to a light (e.g., incident light). The photo detector may include, for example, a photodiode. The photodiode may generate electrons, the amount of which is proportional to the intensity of incident light. The image sensor may measure the intensity of incident light by measuring the amount of electrons generated by the photodiode.

SUMMARY

Some example embodiments of the present inventive concepts provide an image sensor configured to reduce, minimize, or prevent occurrence of a band noise in image data due to a strong incident light disturbing an operation state of the image sensor, a camera module including the image sensor, and an operating method of the image sensor.

According to some example embodiments, an image sensor may include a pixel array that may include a plurality of pixels, wherein each of the plurality of pixels includes a photodiode, a floating diffusion node, a transfer gate transistor between the photodiode and the floating diffusion node, and a first transistor between the floating diffusion node and a first voltage node configured to receive, a row driver that is connected with rows of the plurality of pixels through row lines, wherein, for pixel of pixels of a selected row among the rows, the row driver is configured to a second voltage to a gate of the first transistor such that the first transistor is turned on and the floating diffusion node is reset, and turn on the transfer gate transistor such that electrons integrated in the photodiode are dumped to the floating diffusion node, and an analog-to-digital conversion circuit that is connected with columns of the plurality of pixels through column lines and detects pixel values from the pixels of the selected row. For each pixel of the pixels of the selected row, the row driver may be configured to apply a clamp voltage to the gate of the first transistor while the transfer gate transistor is turned on, wherein the clamp voltage is lower than the second voltage.

According to some example embodiments, a camera module may include an image sensor that is configured to generate image data, and a logic circuit that is configured to generate calibrated image data based on calibrating the image data received from the image sensor. The image sensor may include a pixel array that includes a plurality of pixels, wherein each pixel of the plurality of pixels may include a photodiode, a transfer gate transistor between the photodiode and a floating diffusion node, and a first transistor between the floating diffusion node and a first voltage node configured to receive a first voltage, a row driver that is connected with rows of the plurality of pixels through row lines, wherein, when a readout operation is performed on pixels of a selected row, for each of the pixels of the selected row, the row driver is configured to apply a second voltage to a gate of the first transistor such that the first transistor is turned on and the floating diffusion node is reset, and turn on the transfer gate transistor such that electrons integrated in the photodiode are dumped to the floating diffusion node, and an analog-to-digital conversion circuit that is connected with columns of the plurality of pixels through column lines and detects pixel values from the pixels of the selected row. For each pixel of the pixels of the selected row, the first transistor may be configured to be set to a quasi-on state while the transfer gate transistor is turned on.

According to some example embodiments, an operating method of an image sensor which includes a plurality of pixels, the plurality of pixels including rows of pixels, wherein each pixel of the plurality of pixels includes a photodiode, a transfer gate transistor between the photodiode and a floating diffusion node, and a first transistor between the floating diffusion node and a first voltage node configured to receive a first voltage, may include, for each pixel of pixels belonging to a selected row from among the rows of pixels, applying a second voltage to a gate of the first transistor such that the first transistor is turned on and the floating diffusion node is reset, turning on the transfer gate transistor such that electrons integrated in the photodiode are dumped to the floating diffusion node of the pixel, and applying a clamp voltage, which is lower than the first voltage and the second voltage and is higher than a ground voltage, to the gate of the first transistor, while the transfer gate transistor is turned on.

BRIEF DESCRIPTION OF THE DRAWINGS

The above and other objects and features of the present inventive concepts will become apparent by describing in detail some example embodiments thereof with reference to the accompanying drawings.

DETAILED DESCRIPTION

Figure 1:
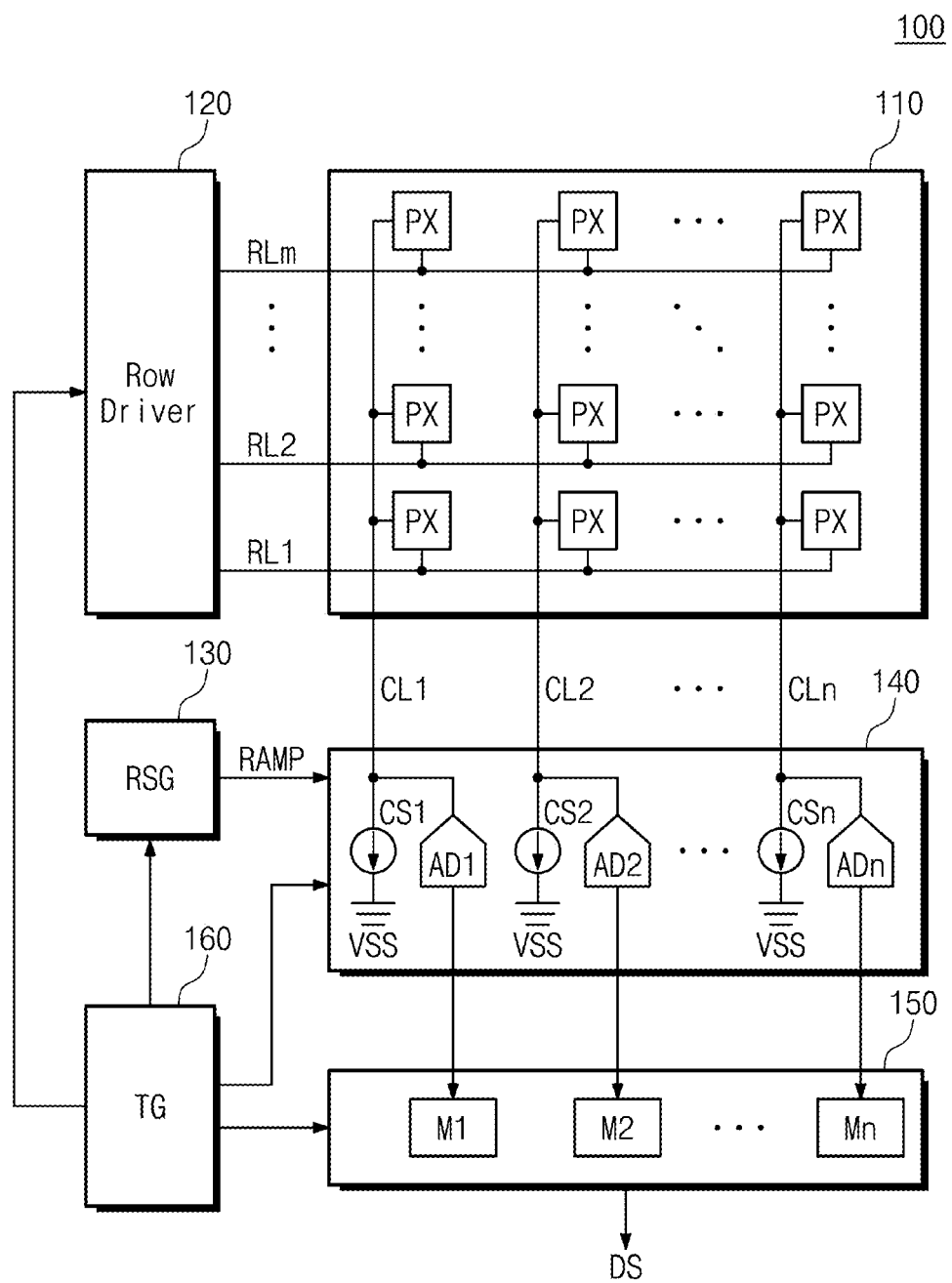
FIG. 1 illustrates an image sensor according to some example embodiments of the present inventive concepts.

Below, some example embodiments of the present inventive concepts will be described in detail and clearly to such an extent that an ordinary one in the art easily implements the present inventive concepts. Below, the term "and/or" is interpreted as including any one of items listed with regard to the term, or a combination of some of the listed items. In this specification, terms indicating an order such as first, and second, are used to distinguish components having the same/similar functions as/to each other, and the first and second may be changed depending on an order in which they are mentioned.

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

While the term "same," "equal" or "identical" may be used in description of some example embodiments, it should be understood that some imprecisions may exist. Thus, when one element is referred to as being the same as another element, it should be understood that an element or a value is the same as another element within a desired manufacturing or operational tolerance range (e.g., ±10%).

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

FIG. 1 illustrates an image sensor 100 according to some example embodiments of the present inventive concepts. Referring to FIG. 1, the image sensor 100 may include a pixel array 110, a row driver 120, a ramp signal generator (RSG) 130, an analog-to-digital conversion circuit 140, a memory circuit 150, and a timing generator (TG) 160.

The pixel array 110 may include a plurality of pixels PX arranged in rows and columns in the form of a matrix. Each of the plurality of pixels PX may include a photo detector. For example, the photo detector may include a photo diode, a photo transistor, a photo gate, a pinned photodiode, etc. Each of the plurality of pixels PX may sense a light by using the photo detector and may convert the amount of the sensed light into an electrical signal, for example, a voltage or a current.

A color filter array (CFA) and lenses may be stacked on the pixel array 110. The color filter array may include red (R) filters, green (G) filters, and blue (B) filters. Two or more different color filters may be disposed at the plurality of pixels PX. For example, at least one blue color filter, at least one red color filter, and at least two green color filters may be disposed at the plurality of pixels PX.

The row driver 120 may be connected with rows of the pixels PX of the pixel array 110 (e.g., first to m-th rows) through first to m-th row lines RL1 to RLm (m being any positive integer). The row driver 120 may decode an address and/or a control signal generated by the timing generator 160. Depending on a result of the decoding, the row driver 120 may sequentially drive the first to m-th row lines RL1 to RLm of the pixel array 110 and may drive a selected row line with a specific voltage. For example, the row driver 120 may drive the selected row line with a voltage appropriate to sense a light.

Each of the first to m-th row lines RL1 to RLm connected with the rows of the pixels PX may include two or more lines (e.g., wires). The two or more lines may respectively transfer, for example, various signals including a signal for selecting (activating) photo detectors of a pixel, a signal for resetting a floating diffusion node, a signal for selecting a column line, a signal for adjusting a conversion gain, etc.

The ramp signal generator 130 may generate a ramp signal RS. The ramp signal generator 130 may operate under control of the timing generator 160. For example, the ramp signal generator 130 may operate in response to control signals such as a ramp enable signal and a mode signal. In response to that the ramp enable signal is activated, the ramp signal generator 130 may generate the ramp signal RS having a slope that is set based on the mode signal. For example, the ramp signal generator 130 may generate the ramp signal RS that continuously decreases or increases from an initial level over time.

The analog-to-digital conversion circuit 140 may be connected with columns of the pixels PX of the pixel array 110 (e.g., first to n-th columns) through first to n-th column lines CL1 to CLn (n being any positive integer). The analog-to-digital conversion circuit 140 may include first to n-th analog-to-digital converters AD1 to ADn and first to n-th current sources CS1 and CSn respectively connected with the first to n-th column lines CL1 to CLn. The first to n-th current sources CS1 and CSn may be connected between a ground node to which a ground voltage VSS is applied and the first to n-th column lines CL1 to CLn. The first to n-th current sources CS1 and CSn may be designed to allow constant current (e.g., constant electrical current) to flow through the first to n-th column lines CL1 to CLn. While the constant currents are supplied from the first to n-th current sources CS1 and CSn, the pixels PX belonging to a selected row line among the first to m-th row lines RL1 to RLm may output pixel voltages corresponding to the intensity of incident light to the first to n-th column lines CL1 to CLn.

The first to n-th analog-to-digital converters AD1 to ADn may receive the ramp signal RS from the ramp signal generator 130 in common. The first to n-th analog-to-digital converters AD1 to ADn may compare voltages of the first to n-th column lines CL1 to CLn with the ramp signal RS. The ramp signal RS refers to a signal that decreases (or increases) at a given rate. The first to n-th analog-to-digital converters AD1 to ADn may latch count values obtained by performing a count operation until the ramp signal RS is smaller (or greater) than voltages of the first to n-th column lines CL1 to CLn and may convert and output the latched count values into digital values.

That is, the first to n-th analog-to-digital converters AD1 to ADn may output (e.g., transmit) digital values corresponding to magnitudes (or amounts) of the voltages (or currents) output from the pixels PX to the first to n-th column lines CL1 to CLn. In some example embodiments, the first to n-th analog-to-digital converters AD1 to ADn may output digital values of initial voltages of the first to n-th column lines CL1 to CLn and digital values of pixel voltages corresponding to the intensity of incident light.

The memory circuit 150 may include first to n-th memories M1 to Mn respectively corresponding to the first to n-th analog-to-digital converters AD1 to ADn. The first to n-th memories M1 to Mn may store digital values (or digital signals) received from the first to n-th analog-to-digital converters AD1 to ADn and may output the stored values (or signals) as a digital signal DS. For example, the first to n-th memories M1 to Mn may output differences between the digital values of the initial voltages and the digital values of the pixel voltages as the digital signal DS.

The timing generator 160 may control timings at which the image sensor 100 operates. The timing generator 160 may control timings for the row driver 120 to sequentially select the first to m-th row lines RL1 to RLm and may control timings to transfer signals through two or more lines included in a row line selected from the first to m-th row lines RL1 to RLm.

The timing generator 160 may control the timing for the ramp signal generator 130 to generate the ramp signal RS and the timing for the ramp signal generator 130 to initialize the ramp signal RS. The timing generator 160 may control the timings for the first to n-th analog-to-digital converters AD1 to ADn to start a count operation and a comparison operation and the timings to initialize the first to n-th analog-to-digital converters AD1 to ADn.

Figure 2:
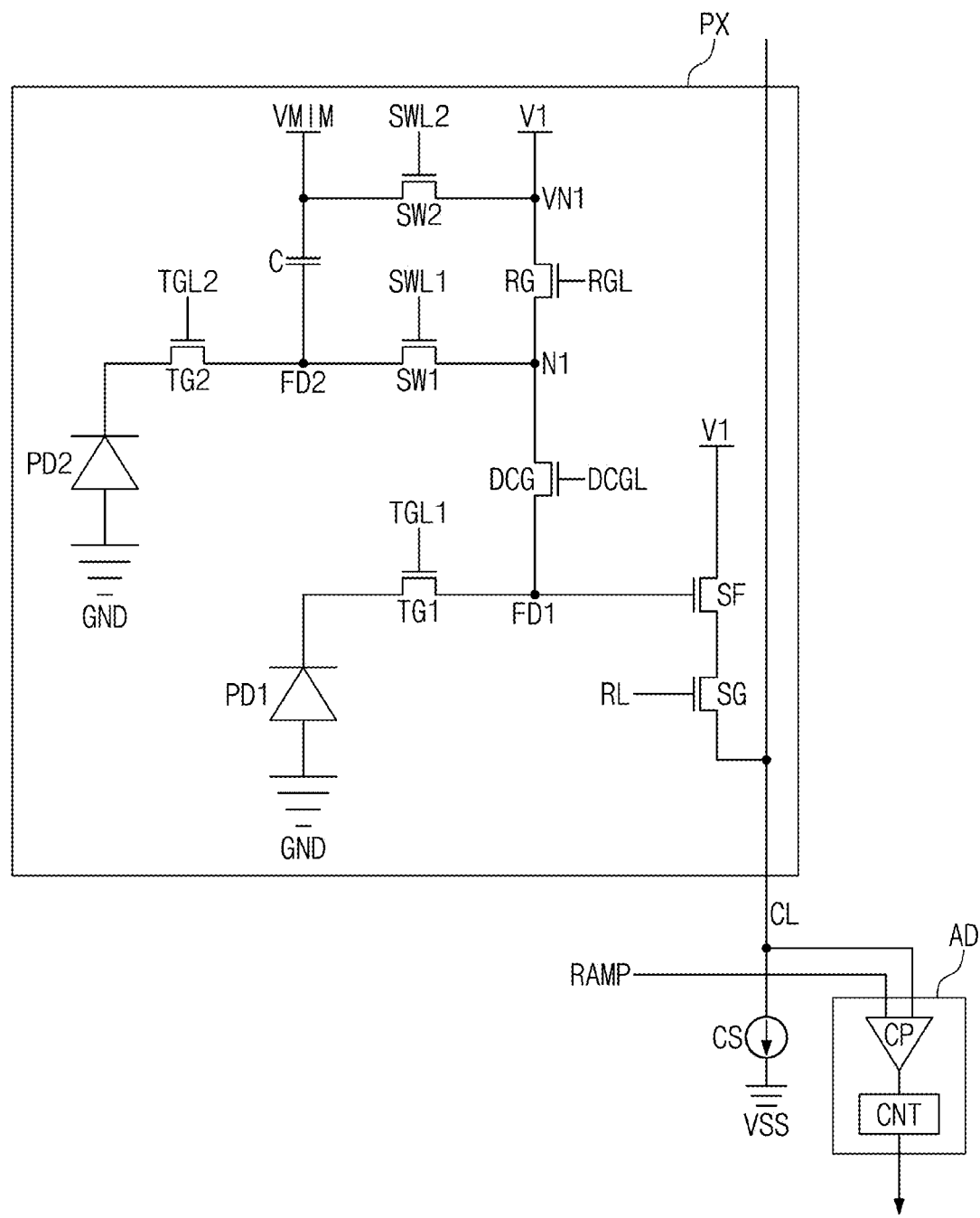
FIG. 2 is a diagram illustrating a pixel and a current source and an analog-to-digital converter corresponding to the pixel, according to some example embodiments of the present inventive concepts.

FIG. 2 is a diagram illustrating a pixel PX and a current source CS and an analog-to-digital converter AD corresponding to the pixel PX, according to some example embodiments of the present inventive concepts. Referring to FIGS. 1 and 2, the pixel PX includes a first photodiode PD1, a first transfer gate transistor TG1, a second photodiode PD2, a second transfer gate transistor TG2, a source follower transistor SF, a selection gate transistor SG, a dynamic conversion gain transistor DCG, a first switch transistor SW1, a second switch transistor SW2, a reset gate transistor RG, and a capacitor "C".

The first photodiode PD1 may be connected between a ground node to which a ground voltage GND is applied and the first transfer gate transistor TG1. The first transfer gate transistor TG1 may include a gate connected with a first transfer gate line TGL1, a first node connected with the first photodiode PD1, and a second node connected with a first floating diffusion node FD1, such that the first transfer gate transistor TG1 is connected between the first photodiode PD1 and the first floating diffusion node FD1.

The second photodiode PD2 may be connected between the ground node to which the ground voltage GND is applied and the second transfer gate transistor TG2. The second transfer gate transistor TG2 may include a gate connected with a second transfer gate line TGL2, a first node connected with the second photodiode PD2, and a second node connected with a second floating diffusion node FD2, such that the second transfer gate transistor TG2 is connected between the second photodiode PD2 and the second floating diffusion node FD2.

The source follower transistor SF may include a gate connected with the first floating diffusion node FD1, a first node connected with a first voltage node to which a first voltage V1 is applied, and a second node connected with a first node of the selection gate transistor SG.

The selection gate transistor SG may include a gate connected with a corresponding row line among the first to m-th row lines RL1 to RLm, the first node connected with the second node of the source follower transistor SF, and a second node connected with a corresponding column line among the first to n-th column lines CL1 to CLn.

The dynamic conversion gain transistor DCG may include a gate connected with a dynamic conversion gain line DCGL, a first node connected with a first node N1 where a second node of the first switch transistor SW1 and a second node of the reset gate transistor RG are connected, and a second node connected with the first floating diffusion node FD1, such that the dynamic conversion gain transistor DCG is connected between the first floating diffusion node FD1 and the first node N1.

The reset gate transistor RG may include a gate connected with a reset gate line RGL, a first node connected with the first voltage node VN1 to which the first voltage V1 is applied (e.g., the first voltage node VN1 is configured to receive the first voltage V1) and a second node of the second switch transistor SW2, and a second node connected with the first node N1 where the second node of the first switch transistor SW1 and the first node of the dynamic conversion gain transistor DCG are connected. The dynamic conversion gain transistor DCG may thus be understood to be connected between the first floating diffusion node FD1 and the first voltage node VN1.

The first switch transistor SW1 may include a gate connected with a first switch line SWL1, a first node connected with the second floating diffusion node FD2, and a second node connected with the first node N1 where the second node of the reset gate transistor RG and the first node of the dynamic conversion gain transistor DCG are connected. The first switch transistor SW1 may thus be understood to be connected between the second floating diffusion node FD2 and the first voltage node VN1.

The capacitor "C" may include a first node connected with a voltage node to which a voltage VMIM is applied and a second node connected with the second floating diffusion node FD2. For example, the first voltage V1 may be a constant voltage. The voltage VMIM may be a voltage that transitions between a high level identical to the first voltage V1 and a low level lower than the first voltage V1 and lower than the ground voltage GND.

The second switch transistor SW2 may include a gate connected with a second switch line SWL2, a first node connected with the first node of the capacitor "C" and the voltage node to which the voltage VMIM is applied, and the second node connected with the first voltage node VN1 and the first node of the reset gate transistor RG.

In some example embodiments, the size of the first photodiode PD1 may be larger than the size of the second photodiode PD2. Accordingly, when the same incident light is received, the amount of electrons generated by the first photodiode PD1 may be more (e.g., greater) than the amount of electrons generated by the second photodiode PD2.

The current source CS may be connected between the ground node to which the ground voltage GND is applied and the column line CL. The current source CS may be implemented with a current mirror that operates as a current sink. The current source CS may include at least one transistor provided between the ground node and the column line CL. To supply a constant current to the column line CL, the at least one transistor may be designed to operate in a saturation state.

The analog-to-digital converter AD may include a comparator CP and a counter CNT. The comparator CP may compare the ramp signal RAMP and a voltage of the column line CL, for example, an initial voltage or a pixel voltage. The counter CNT may perform the count operation from a given time to a time when the output of the comparator CP changes, for example, to a time when the ramp signal RAMP is greater or smaller than the voltage of the column line CL. A count value obtained from the initial voltage of the column line CL may be an initial value. A difference between the initial value and a count value obtained from the pixel voltage of the column line CL may be a pixel value. For example, the pixel value may be a value that is obtained by subtracting the count value of the pixel voltage from the initial value.

In the process where the pixel PX converts the intensity of incident light into a pixel voltage, first, the reset gate transistor RG and the dynamic conversion gain transistor DCG may be turned on, and the first floating diffusion node FD1 may be initialized with the first voltage V1. The first transfer gate transistor TG1 may dump electrons generated by the first floating diffusion node FD1 to the first floating diffusion node FD1. The voltage of the first floating diffusion node FD1 may decrease from the first voltage V1 due to the dumped electrons. The source follower transistor SF may output the pixel voltage corresponding to a voltage change of the first floating diffusion node FD1 to the column line CL through the selection gate transistor SG.

As the intensity of light incident onto the pixel PX increases, the amount of electrons that the first photodiode PD1 generates may increase. As the amount of electrons dumped to the first floating diffusion node FD1 increases, a decrement of the voltage of the first floating diffusion node FD1 may become greater.

In some example embodiments, when the amount of electrons generated by the first photodiode PD1 increases, the increment of the voltage of the first floating diffusion node FD1 may become greater to such an extent that the transistor of the current source CS connected with the column line CL enters a triode state from the saturation state. For example, when a strong light (e.g., high-intensity incident light) such as sunlight or an illumination light is incident onto a pixel, the transistor of the current source CS may enter the triode state from the saturation state.

When the transistor of the current source CS enters the triode state from the saturation state, the amount of current sunk by the current source CS may decrease; in this case, the first voltage V1 may temporarily increase. As the first voltage V1 increased temporarily causes an increase in output voltages of the source follower transistors SF of the pixels PX sharing the row line RL, the pixel voltages of the pixels PX may increase, and the pixel values corresponding to the pixel voltages may decrease; in this case, a band noise that brightness decreases due to the above process may occur.

Some example embodiments of the present inventive concepts are directed to provide an image sensor configured to reduce, minimize, or prevent occurrence of a band noise when electrons are generated by the first photodiode PD1 to such an extent that the current source is out of the saturation state, a camera module including the image sensor, and an operating method of the image sensor.

Figure 3:
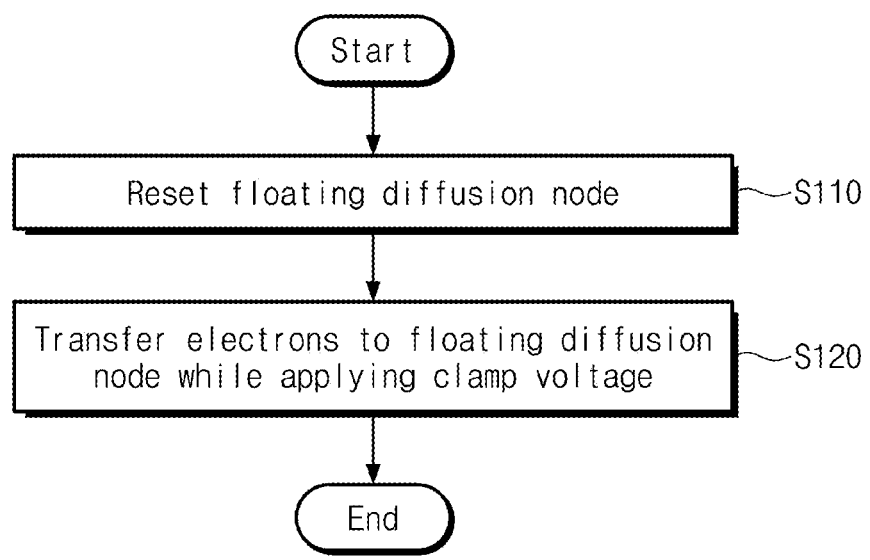
FIG. 3 is a diagram illustrating an operating method of an image sensor according to some example embodiments of the present inventive concepts.

FIG. 3 is a diagram illustrating an operating method of the image sensor 100 according to some example embodiments of the present inventive concepts. The operating method shown in FIG. 3, including operations S110 and S120, may be performed for each pixel PX of a selected row (e.g., first to m-th row) of pixels PX of the pixels of the pixel array 110. Referring to FIGS. 1, 2, and 3, in operation S110, the row driver 120 may, for a given pixel PX of a selected row (e.g., first to m-th row) of pixels PX of the pixels of the pixel array 110, reset a floating diffusion node. For example, the row driver 120 may apply a turn-on voltage to the reset gate line RGL to turn on the reset gate transistor RG of the given pixel and may apply the turn-on voltage to the dynamic conversion gain line DCGL to turn on the dynamic conversion gain transistor DCG of the given pixel PX. The first floating diffusion node FD1 (e.g., of the given pixel PX) may be reset with the first voltage V1 through the reset gate transistor RG of the given pixel PX and the dynamic conversion gain transistor DCG of the given pixel PX.

In operation S120, the row driver 120 may, for a given pixel PX of a selected row (e.g., first to m-th row) of pixels PX of the pixels of the pixel array 110, apply a clamp voltage while electrons generated by the photodiode are transferred to a floating diffusion node (e.g., of the given pixel PX). For example, after the first floating diffusion node FD1 of the given pixel PX is reset, when an exposure time (e.g., determined by the design of the given pixel PX) passes, the row driver 120 may apply the turn-on voltage to the first transfer gate line TGL1 to turn on the first transfer gate transistor TG1 of the given pixel PX; in some example embodiments, electrons generated by the first photodiode PD1 of the given pixel PX may be transferred (or dumped) to the first floating diffusion node FD1 of the given pixel PX. While the first transfer gate transistor TG1 of the given pixel PX is turned on, the row driver 120 may apply the clamp voltage to at least one transistor connected with the first floating diffusion node FD1 of the given pixel PX, for example, the dynamic conversion gain transistor DCG of the given pixel PX or both the dynamic conversion gain transistor DCG of the given pixel PX and the reset gate transistor RG of the given pixel PX.

The clamp voltage may be a positive voltage greater (e.g., having a greater magnitude) than the ground voltage GND. The clamp voltage may be smaller than a threshold voltage of the dynamic conversion gain transistor DCG or the reset gate transistor RG. A turn-on voltage that the row driver 120 may be configured to apply to the first transfer gate line TGL1 to turn on the first transfer gate transistor TG1 of the given pixel PX may be greater (e.g., higher) than the clamp voltage. The clamp voltage may allow the dynamic conversion gain transistor DCG or the reset gate transistor RG to be in a quasi-on state. A potential barrier of the transistor of the quasi-on state may be lower than a potential barrier of a transistor of a turn-off state.

Figure 4:
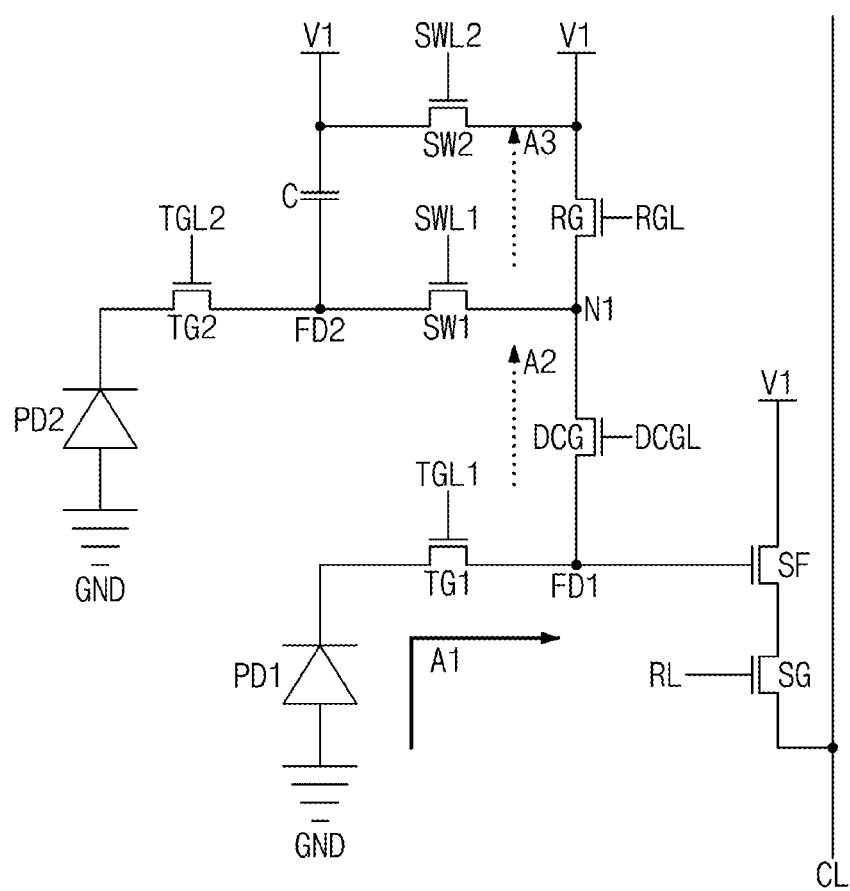
FIG. 4 is a diagram illustrating an example in which a clamp voltage is applied to a pixel according to some example embodiments of the present inventive concepts.

FIG. 4 is a diagram illustrating an example in which a clamp voltage is applied to the pixel PX, which may be any given pixel of a selected row among the first to m-th rows of pixels PX of the pixel array 110, according to some example embodiments of the present inventive concepts. Referring to FIG. 4, as shown by a first arrow A1, electrons generated by the first photodiode PD1 may be dumped to the first floating diffusion node FD1.

Electrons which exceed the potential barrier of the dynamic conversion gain transistor DCG of the quasi-on state, from among the electrons dumped to the first floating diffusion node FD1 may pass through the dynamic conversion gain transistor DCG as shown by a second arrow A2. Electrons which exceed the potential barrier of the reset gate transistor RG of the quasi-on state, from among electrons accumulated at the first node N1 after passing through the dynamic conversion gain transistor DCG may pass through the reset gate transistor RG. Accordingly, electrons may be prevented from being excessively accumulated at the first floating diffusion node FD1, or such excessive accumulation may be reduced or minimized, and a voltage of the column line CL is prevented from excessively decreasing, or such excessive decrease may be reduced or minimized. Accordingly, a transistor of a current mirror connected with the column line CL may be maintained in the saturation state.

Figure 5:
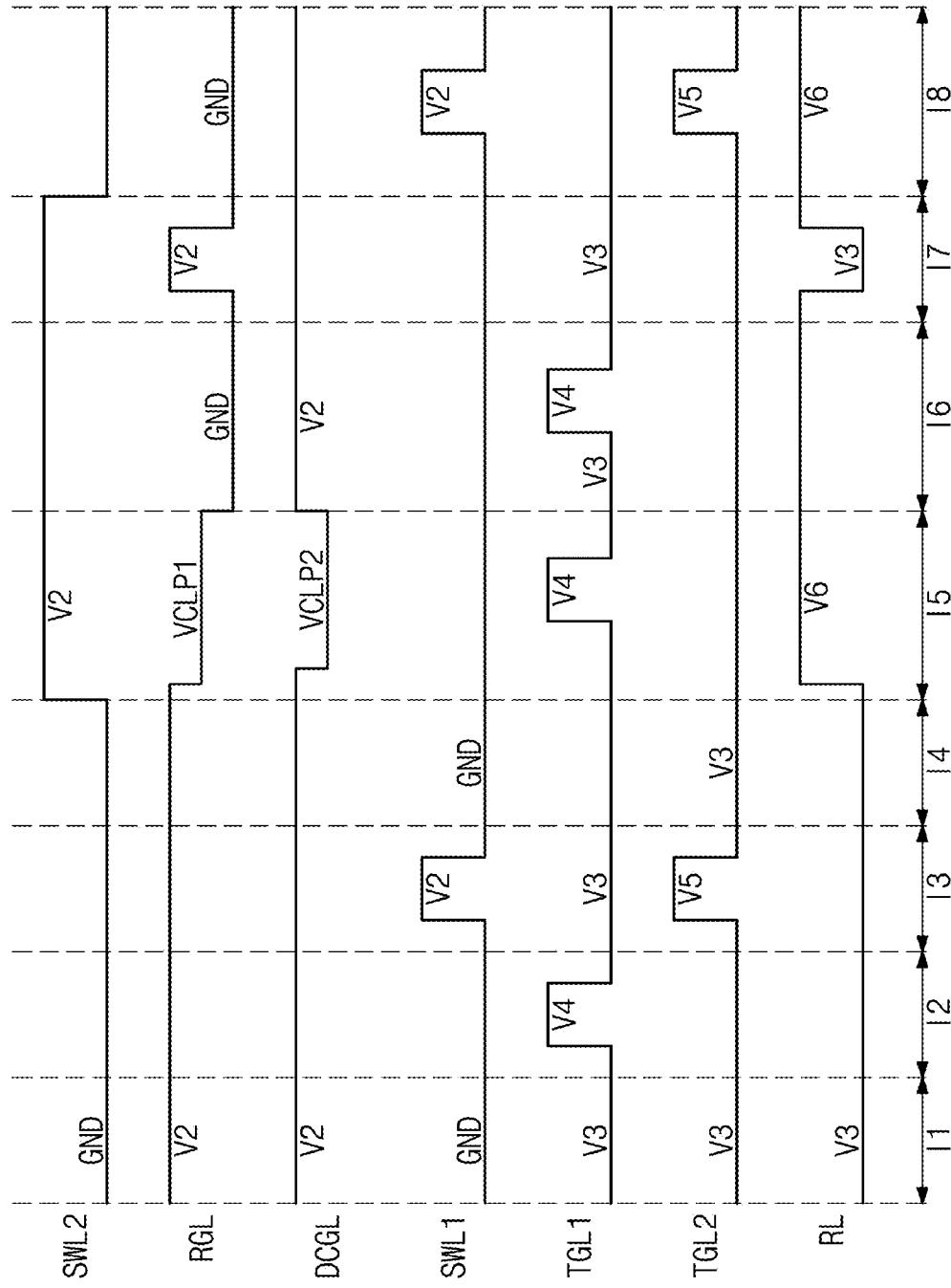
FIG. 5 is a diagram illustrating an example of signals that a row driver applies to a pixel according to some example embodiments of the present inventive concepts.

FIG. 5 is a diagram illustrating an example of signals that the row driver 120 applies to the pixel PX, which may be any given pixel of a selected row among the first to m-th rows of pixels PX of the pixel array 110, according to some example embodiments of the present inventive concepts.

Referring to FIGS. 1, 2, and 5, a first interval I1 may correspond to an initial interval. In the first interval I1, the row driver 120 may apply the ground voltage GND to the second switch line SWL2, may apply a second voltage V2 to the reset gate line RGL, may apply the second voltage V2 to the dynamic conversion gain line DCGL, may apply the ground voltage GND to the first switch line SWL1, may apply a third voltage V3 to the first transfer gate line TGL1, may apply the third voltage V3 to the second transfer gate line TGL2, and may apply the third voltage V3 to the row line RL.

The second voltage V2 may be higher (e.g., greater) than the first voltage V1. The third voltage V3 may be a negative voltage lower than the ground voltage GND.

The reset gate transistor RG and the dynamic conversion gain transistor DCG may be turned on by the second voltage V2, and the first floating diffusion node FD1 may be reset with the first voltage V1.

A second interval I2 may be a first photodiode (PD1) shutter interval, for example, an initialization interval. In the second interval I2, the row driver 120 may apply the ground voltage GND to the second switch line SWL2, may apply the second voltage V2 to the reset gate line RGL, may apply the second voltage V2 to the dynamic conversion gain line DCGL, may apply the ground voltage GND to the first switch line SWL1, may apply a fourth voltage V4 to the first transfer gate line TGL1, may apply the third voltage V3 to the second transfer gate line TGL2, and may apply the third voltage V3 to the row line RL.

The fourth voltage V4 may be lower than the first voltage V1 and may be higher than the ground voltage GND.

The first transfer gate transistor TG1 may be turned on by the fourth voltage V4, and electrons accumulated in the first photodiode PD1 may be emptied. Because the reset gate transistor RG and the dynamic conversion gain transistor DCG are turned on, the electrons accumulated in the first photodiode PD1 may be discharged through a second power node to which the second voltage V2 is applied, and the voltage of the first floating diffusion node FD1 may be initialized with the second voltage V2.

A third interval I3 may be a second photodiode (PD2) shutter interval, for example, an initialization interval. In the third interval I3, the row driver 120 may apply the ground voltage GND to the second switch line SWL2, may apply the second voltage V2 to the reset gate line RGL, may apply the second voltage V2 to the dynamic conversion gain line DCGL, may apply the second voltage V2 to the first switch line SWL1, may apply the third voltage V3 to the first transfer gate line TGL1, may apply the third voltage V3 to the second transfer gate line TGL2 after applying a fifth voltage V5 to the second transfer gate line TGL2, and may apply the third voltage V3 to the row line RL.

The fifth voltage V5 may be equal to or greater than the fourth voltage V4.

The first switch transistor SW1 may be turned on by the second voltage V2, and the second transfer gate transistor TG2 may be turned on by the fifth voltage V5. Electrons accumulated in the second photodiode PD2 may be emptied, and the second floating diffusion node FD2 may be reset with the first voltage V1.

A fourth interval I4 may be a light integration interval. In the fourth interval I4, the row driver 120 may apply the ground voltage GND to the second switch line SWL2, may apply the second voltage V2 to the reset gate line RGL, may apply the second voltage V2 to the dynamic conversion gain line DCGL, may apply the ground voltage GND to the first switch line SWL1, may apply the third voltage V3 to the first transfer gate line TGL1, may apply the third voltage V3 to the second transfer gate line TGL2, and may apply the third voltage V3 to the row line RL.

A fifth interval I5 may be a high conversion gain (HCG) readout interval of the first photodiode PD1. In the fifth interval I5, the row driver 120 may apply the second voltage V2 to the second switch line SWL2, may apply a first clamp voltage VCLP1 to the reset gate line RGL, may apply a second clamp voltage VCLP2 to the dynamic conversion gain line DCGL, may apply the ground voltage GND to the first switch line SWL1, may apply the third voltage V3 to the first transfer gate line TGL1 after applying the fourth voltage V4 to the first transfer gate line TGL1, may apply the third voltage V3 to the second transfer gate line TGL2, and may apply a sixth voltage V6 to the row line RL.

The sixth voltage V6 may be equal to or greater than the second voltage V2. The first clamp voltage VCLP1 and the second clamp voltage VCLP2 may be equal to and different from each other. The first clamp voltage VCLP1 and the second clamp voltage VCLP2 may be a positive voltage that is lower than the first voltage V1 and is higher than the ground voltage GND. The first clamp voltage VCLP1 may be lower than a threshold voltage of the reset gate transistor RG. The first clamp voltage VCLP1 may allow the reset gate transistor RG to be in the quasi-on state. The second clamp voltage VCLP2 may be lower than a threshold voltage of the dynamic conversion gain transistor DCG. The second clamp voltage VCLP2 may allow the dynamic conversion gain transistor DCG to be in the quasi-on state.

The timing to apply the first clamp voltage VCLP1 to the reset gate line RGL and the timing to apply the sixth voltage V6 to the row line RL may be identical. The timing to apply the second clamp voltage VCLP2 to the dynamic conversion gain line DCGL may be delayed with respect to the timing to apply the first clamp voltage VCLP1 to the reset gate line RGL.

In the fifth interval I5, the phenomenon described with reference to FIG. 4 may occur in the pixel PX. The first transfer gate transistor TG1 may be turned on by the fourth voltage V4 and may dump electrons of the first photodiode PD1 to the first floating diffusion node FD1. The dynamic conversion gain transistor DCG and the reset gate transistor RG may be set to the quasi-on state and may leak out a current exceeding the potential barrier thereof. The selection gate transistor SG may be turned on by the sixth voltage V6 and may transfer a voltage change of the first floating diffusion node FD1 to the column line CL.

A sixth interval I6 may be a low conversion gain (LCG) readout interval of the first photodiode PD1. In the sixth interval I6, the row driver 120 may apply the second voltage V2 to the second switch line SWL2, may apply the ground voltage GND to the reset gate line RGL, may apply the second voltage V2 to the dynamic conversion gain line DCGL, may apply the ground voltage GND to the first switch line SWL1, may apply the third voltage V3 to the first transfer gate line TGL1 after applying the fourth voltage V4 to the first transfer gate line TGL1, may apply the third voltage V3 to the second transfer gate line TGL2, and may apply the sixth voltage V6 to the row line RL.

The dynamic conversion gain transistor DCG may be turned on by the second voltage V2 and may increase a capacitance of the first floating diffusion node FD1. The reset gate transistor RG may be set to the quasi-on state by the first clamp voltage VCLP1 and may leak out electrons exceeding the potential barrier. The first transfer gate transistor TG1 may be turned on by the fourth voltage V4 and may dump electrons of the first photodiode PD1 to the first floating diffusion node FD1. The selection gate transistor SG may be turned on by the sixth voltage V6 and may transfer a voltage change of the first floating diffusion node FD1 to the column line CL.

A seventh interval I7 may be a middle initialization interval. In the seventh interval I7, the row driver 120 may apply the second voltage V2 to the second switch line SWL2, may apply the ground voltage GND to the reset gate line RGL after applying the second voltage V2 to the reset gate line RGL, may apply the second voltage V2 to the dynamic conversion gain line DCGL, may apply the ground voltage GND to the first switch line SWL1, may apply the third voltage V3 to the first transfer gate line TGL1, may apply the third voltage V3 to the second transfer gate line TGL2, and may apply the sixth voltage V6 to the row line RL after applying the third voltage V2 to the row line RL.

The dynamic conversion gain transistor DCG and the reset gate transistor RG may be turned on by the second voltage V2 and may initialize the first floating diffusion node FD1 with the first voltage V1.

An eighth interval I8 may be a second photodiode (PD2) readout interval. In the eighth interval I8, the row driver 120 may apply the ground voltage GND to the second switch line SWL2, may apply the ground voltage GND to the reset gate line RGL, may apply the second voltage V2 to the dynamic conversion gain line DCGL, may apply the ground voltage GND to the first switch line SWL1 after applying the fifth voltage V5 to the first switch line SWL1, may apply the third voltage V3 to the first transfer gate line TGL1, may apply the third voltage V3 to the second transfer gate line TGL2 after applying the fifth voltage V5 to the second transfer gate line TGL2, and may apply the sixth voltage V6 to the row line RL.

The second transfer gate transistor TG2 may be turned on by the fifth voltage V5 and may dump electrons accumulated in the second photodiode PD2 to the second floating diffusion node FD2. The first switch transistor SW1 and the dynamic conversion gain transistor DCG may be turned on by the second voltage V2 and may transfer a voltage change of the second floating diffusion node FD2 to the first floating diffusion node FD1. The selection gate transistor SG may be turned on by the sixth voltage V6 and may transfer a voltage change of the first floating diffusion node FD1 to the column line CL.

In some example embodiments, including the example embodiments shown in FIG. 5, the image sensor 100 may clamp the voltage of the first floating diffusion node FD1 by using the dynamic conversion gain transistor DCG and the reset gate transistor RG in the high conversion gain readout interval of the first photodiode PD1, that is, in the fifth interval I5.

Figure 6:
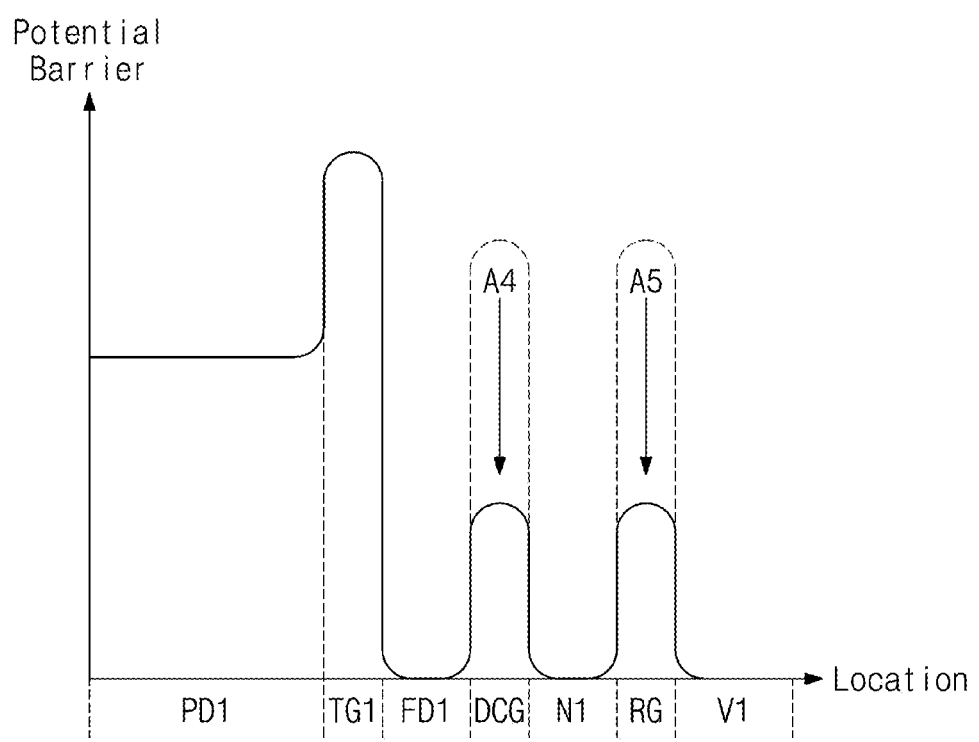
FIG. 6 is a diagram illustrating an example of potential barriers of some transistors of a pixel in a fifth interval of FIG. 5 according to some example embodiments of the present inventive concepts.

FIG. 6 is a diagram illustrating an example of potential barriers of some transistors of the pixel PX in the fifth interval I5 of FIG. 5 according to some example embodiments of the present inventive concepts. In FIG. 6, a horizontal axis represents a location, and a vertical axis represents a potential barrier. In FIG. 6, potential barriers of the first photodiode PD1, the first transfer gate transistor TG1, the first floating diffusion node FD1, the dynamic conversion gain transistor DCG, the first node N1, the reset gate transistor RG, and the node to which the first voltage V1 is supplied are illustrated along the horizontal axis.

As shown by a fourth arrow A4, in the fifth interval I5, the dynamic conversion gain transistor DCG may be set to the quasi-on state by the second clamp voltage VCLP2, and thus, the potential barrier of the dynamic conversion gain transistor DCG may decrease. Accordingly, electrons exceeding the potential barrier of the dynamic conversion gain transistor DCG may be leaked out to the first node N1.

Also, as shown by a fifth arrow A5, the reset gate transistor RG may be set to the quasi-on state by the first clamp voltage VCLP1, and thus, the potential barrier of the reset gate transistor RG may decrease. Accordingly, electrons exceeding the potential barrier of the reset gate transistor RG may be leaked out to the node of the first voltage V1.

Figure 7:
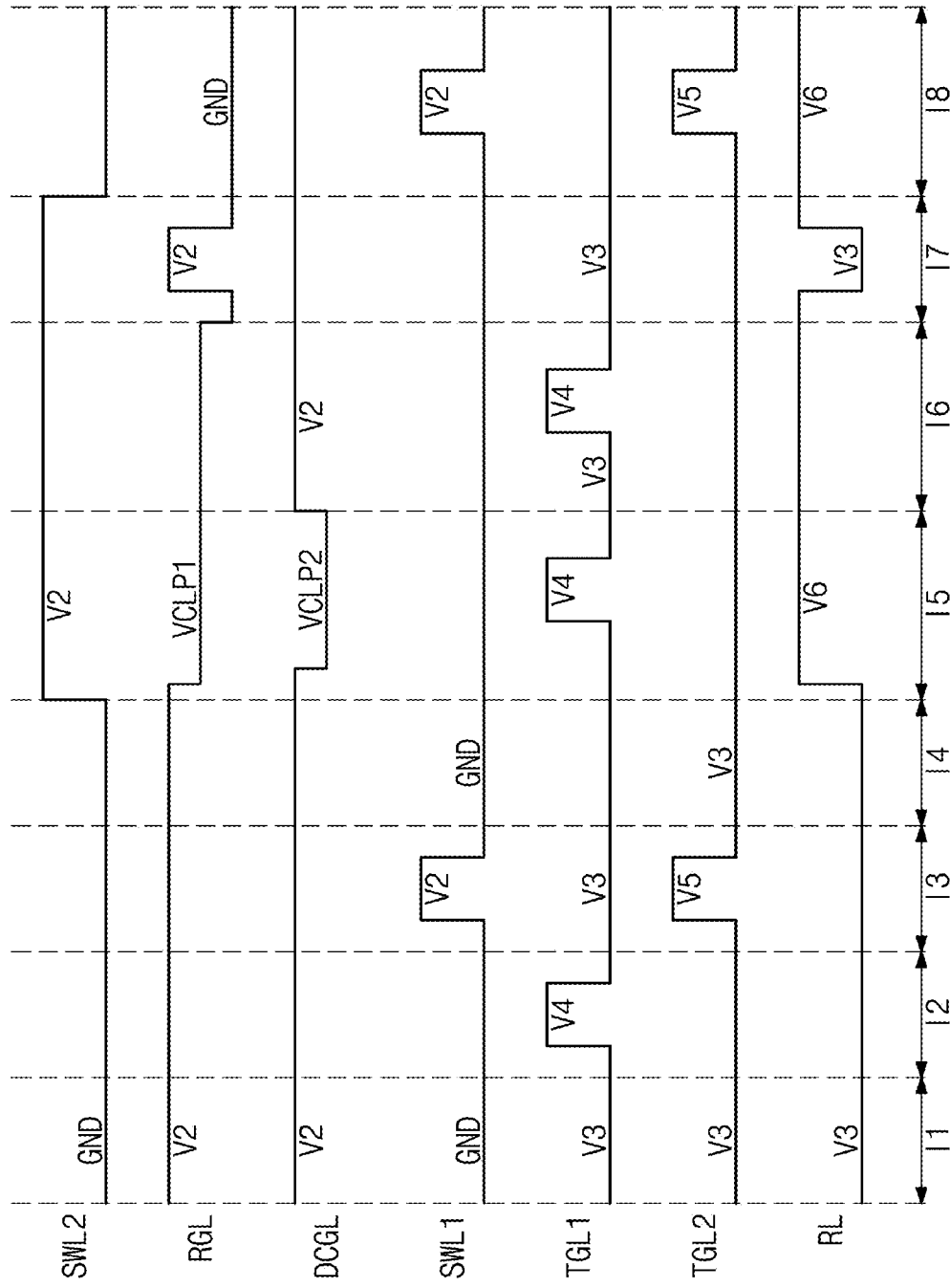
FIG. 7 is diagram illustrating another example of signals that a row driver applies to a pixel according to some example embodiments of the present inventive concepts.

FIG. 7 is a diagram illustrating another example of signals that the row driver 120 applies to the pixel PX according to some example embodiments of the present inventive concepts. Referring to FIGS. 1, 2, and 7, the first interval I1, the second interval I2, the third interval I3, the fourth interval I4, the fifth interval I5, the seventh interval I7, and the eighth interval I8 are identical to the first interval I1, the second interval I2, the third interval I3, the fourth interval I4, the fifth interval I5, the seventh interval I7, and the eighth interval I8 described with reference to FIG. 5. Thus, additional description will be omitted to avoid redundancy. The features described with reference to the first interval I1, the second interval I2, the third interval I3, the fourth interval I4, the fifth interval I5, the seventh interval I7, and the eighth interval I8 of FIG. 5 may be identically applied to the first interval I1, the second interval I2, the third interval I3, the fourth interval I4, the fifth interval I5, the seventh interval I7, and the eighth interval I8 of FIG. 7.

As described with reference to FIG. 5, in the fifth interval I5, the image sensor 100 may clamp the voltage of the first floating diffusion node FD1 by using the dynamic conversion gain transistor DCG and the reset gate transistor RG.

A sixth interval I6 may be a low conversion gain (LCG) readout interval of the first photodiode PD1. In the sixth interval I6, the row driver 120 may apply the second voltage V2 to the second switch line SWL2, may apply the first clamp voltage VCLP1 to the reset gate line RGL, may apply the second voltage V2 to the dynamic conversion gain line DCGL, may apply the ground voltage GND to the first switch line SWL1, may apply the third voltage V3 to the first transfer gate line TGL1 after applying the fourth voltage V4 to the first transfer gate line TGL1, may apply the third voltage V3 to the second transfer gate line TGL2, and may apply the sixth voltage V6 to the row line RL.

The dynamic conversion gain transistor DCG may be turned on by the second voltage V2 and may increase a capacitance of the first floating diffusion node FD1. The reset gate transistor RG may be set to the quasi-on state by the first clamp voltage VCLP1 and may leak out electrons exceeding the potential barrier. The first transfer gate transistor TG1 may be turned on by the fourth voltage V4 and may dump electrons of the first photodiode PD1 to the first floating diffusion node FD1. The selection gate transistor SG may be turned on by the sixth voltage V6 and may transfer a voltage change of the first floating diffusion node FD1 to the column line CL.

In some example embodiments, including the example embodiments shown in FIG. 7, the image sensor 100 may clamp the voltage of the first floating diffusion node FD1 by using the dynamic conversion gain transistor DCG and the reset gate transistor RG in the high conversion gain readout interval of the first photodiode PD1, that is, in the fifth interval I5. Also, the image sensor 100 may clamp the voltage of the first floating diffusion node FD1 by using the reset gate transistor RG in the low conversion gain readout interval of the first photodiode PD1, that is, in the sixth interval I6.

Figure 8:
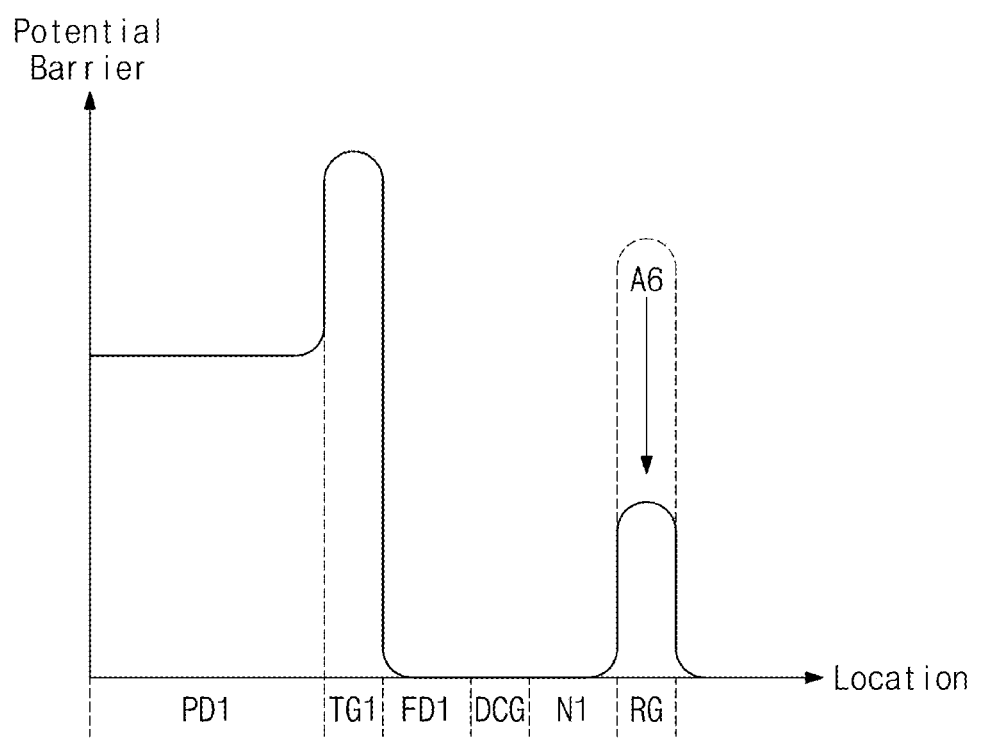
FIG. 8 is a diagram illustrating an example of potential barriers of some transistors of a pixel in a sixth interval of FIG. 7 according to some example embodiments of the present inventive concepts.

FIG. 8 is a diagram illustrating an example of potential barriers of some transistors of the pixel PX in the sixth interval I6 of FIG. 7 according to some example embodiments of the present inventive concepts. In FIG. 8, a horizontal axis represents a location, and a vertical axis represents a potential barrier. In FIG. 8, potential barriers of the first photodiode PD1, the first transfer gate transistor TG1, the first floating diffusion node FD1, the dynamic conversion gain transistor DCG, the first node N1, the reset gate transistor RG, and the node to which the first voltage V1 is supplied are illustrated along the horizontal axis.

As shown by a sixth arrow A6, in the sixth interval I6, the reset gate transistor RG may be set to the quasi-on state by the first clamp voltage VCLP1, and thus, the potential barrier of the reset gate transistor RG may decrease. Accordingly, electrons exceeding the potential barrier of the reset gate transistor RG may be leaked out to the node of the first voltage V1.

In some example embodiments, the potential barriers of the fifth interval I5 of FIG. 7 may be identical to those described with reference to FIG. 6. Thus, additional description will be omitted to avoid redundancy.

Figure 9:
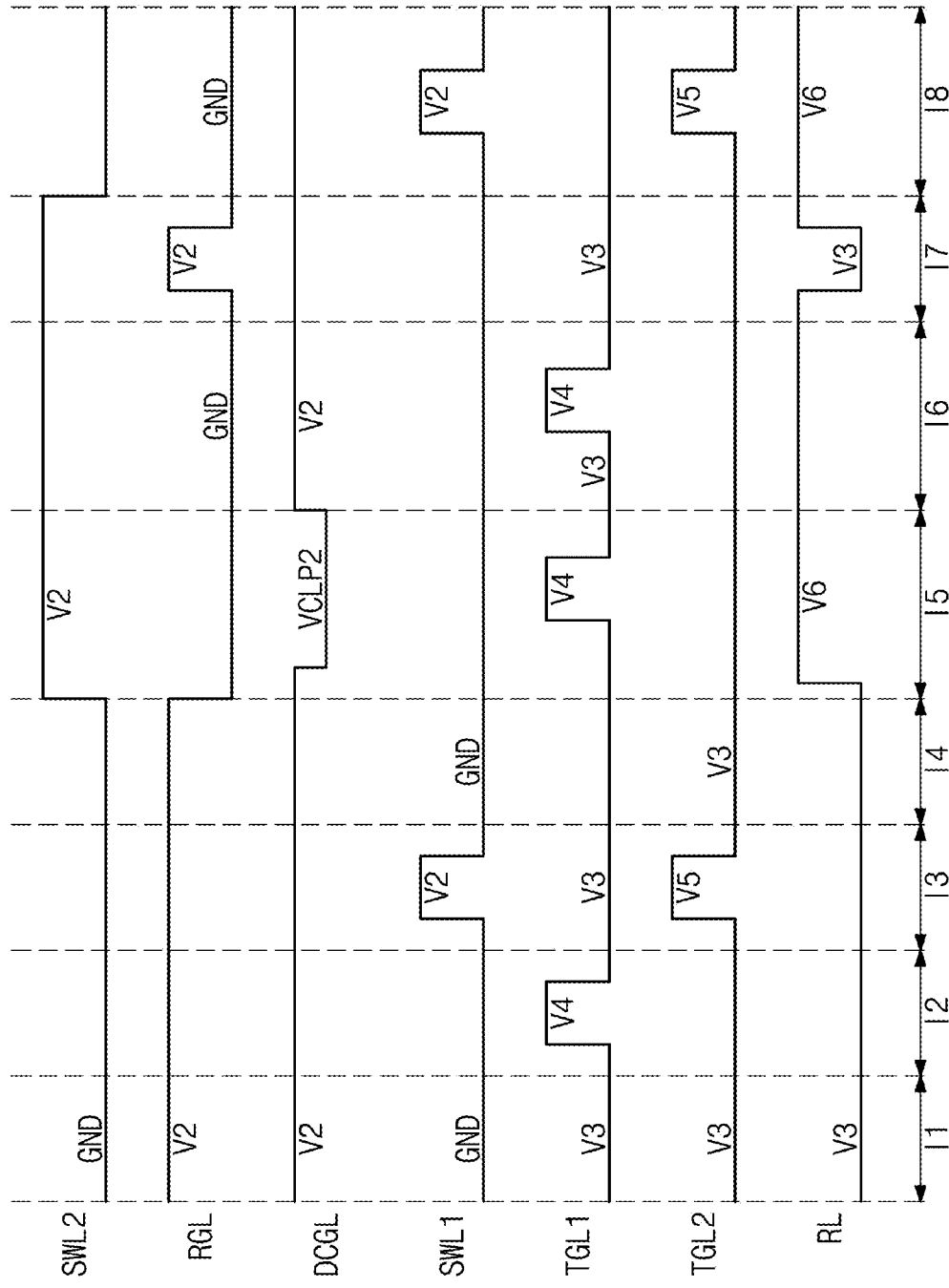
FIG. 9 is a diagram illustrating another example of signals that a row driver applies to a pixel according to some example embodiments of the present inventive concepts.

FIG. 9 is a diagram illustrating another example of signals that the row driver 120 applies to the pixel PX according to some example embodiments of the present inventive concepts. Referring to FIGS. 1, 2, and 9, the first interval I1, the second interval I2, the third interval I3, the fourth interval I4, the sixth interval I6, the seventh interval I7, and the eighth interval I8 are identical to the first interval I1, the second interval I2, the third interval I3, the fourth interval I4, the sixth interval I6, the seventh interval I7, and the eighth interval I8 described with reference to FIG. 5. Thus, additional description will be omitted to avoid redundancy. The features described with reference to the first interval I1, the second interval I2, the third interval I3, the fourth interval I4, the sixth interval I6, the seventh interval I7, and the eighth interval I8 of FIG. 5 may be identically applied to the first interval I1, the second interval I2, the third interval I3, the fourth interval I4, the sixth interval I6, the seventh interval I7, and the eighth interval I8 of FIG. 9.

A fifth interval I5 may be a high conversion gain (HCG) readout interval of the first photodiode PD1. In the fifth interval I5, the row driver 120 may apply the second voltage V2 to the second switch line SWL2, may apply the ground voltage GND to the reset gate line RGL, may apply the second clamp voltage VCLP2 to the dynamic conversion gain line DCGL, may apply the ground voltage GND to the first switch line SWL1, may apply the third voltage V3 to the first transfer gate line TGL1 after applying the fourth voltage V4 to the first transfer gate line TGL1, may apply the third voltage V3 to the second transfer gate line TGL2, and may apply the sixth voltage V6 to the row line RL.

The dynamic conversion gain transistor DCG may be set to the quasi-on state by the second clamp voltage VCLP2. The reset gate transistor RG may be turned off by the ground voltage GND. The first transfer gate transistor TG1 may be turned on by the fourth voltage V4 and may dump electrons of the first photodiode PD1 to the first floating diffusion node FD1. The dynamic conversion gain transistor DCG may be set to the quasi-on state and may leak out a current exceeding the potential barrier thereof. The selection gate transistor SG may be turned on by the sixth voltage V6 and may transfer a voltage change of the first floating diffusion node FD1 to the column line CL.

In some example embodiments, including the example embodiments shown in FIG. 9, the image sensor 100 may clamp the voltage of the first floating diffusion node FD1 by using the dynamic conversion gain transistor DCG in the high conversion gain readout interval of the first photodiode PD1, that is, in the fifth interval I5.

Figure 10:
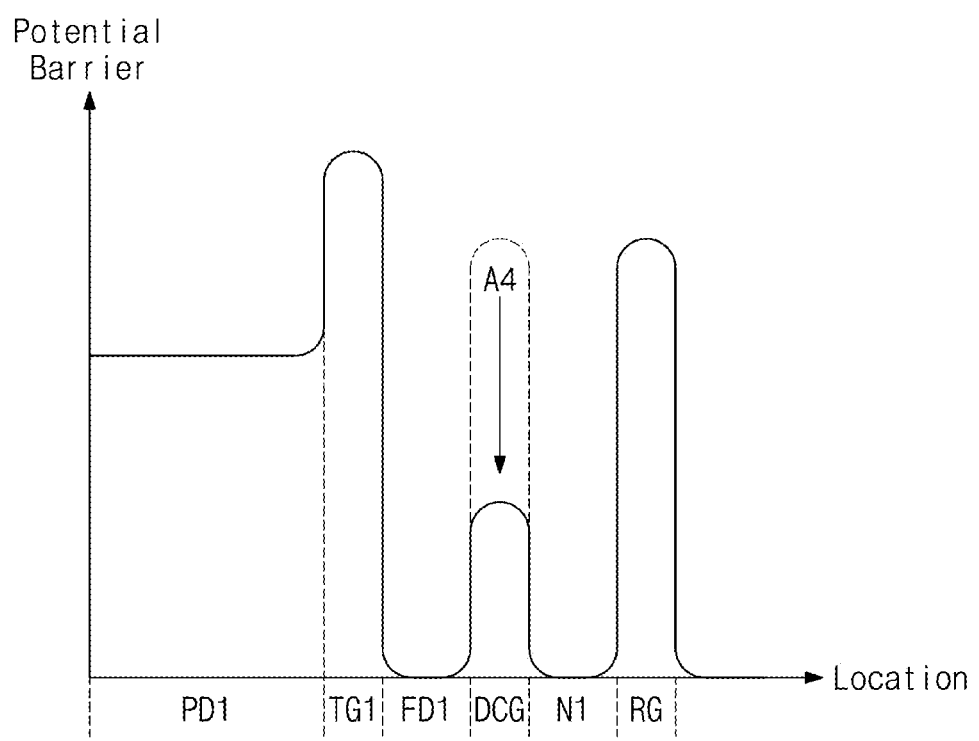
FIG. 10 is a diagram illustrating an example of potential barriers of some transistors of a pixel in a fifth interval of FIG. 5 according to some example embodiments of the present inventive concepts.

FIG. 10 is a diagram illustrating an example of potential barriers of some transistors of the pixel PX in the fifth interval I5 of FIG. 5 according to some example embodiments of the present inventive concepts. In FIG. 10, a horizontal axis represents a location, and a vertical axis represents a potential barrier. In FIG. 10, potential barriers of the first photodiode PD1, the first transfer gate transistor TG1, the first floating diffusion node FD1, the dynamic conversion gain transistor DCG, the first node N1, the reset gate transistor RG, and the node to which the first voltage V1 is supplied are illustrated along the horizontal axis.

As shown by a sixth arrow A6, in the fifth interval I5, the dynamic conversion gain transistor DCG may be set to the quasi-on state by the second clamp voltage VCLP2, and thus, the potential barrier of the dynamic conversion gain transistor DCG may decrease. Accordingly, electrons, the amount of which exceeds the potential barrier of the dynamic conversion gain transistor DCG, may be leaked out to the first node N1.

In some example embodiments, the potential barriers of the fifth interval I5 of FIG. 10 may be identical to those described with reference to FIG. 8. Thus, additional description will be omitted to avoid redundancy.

Figure 11:
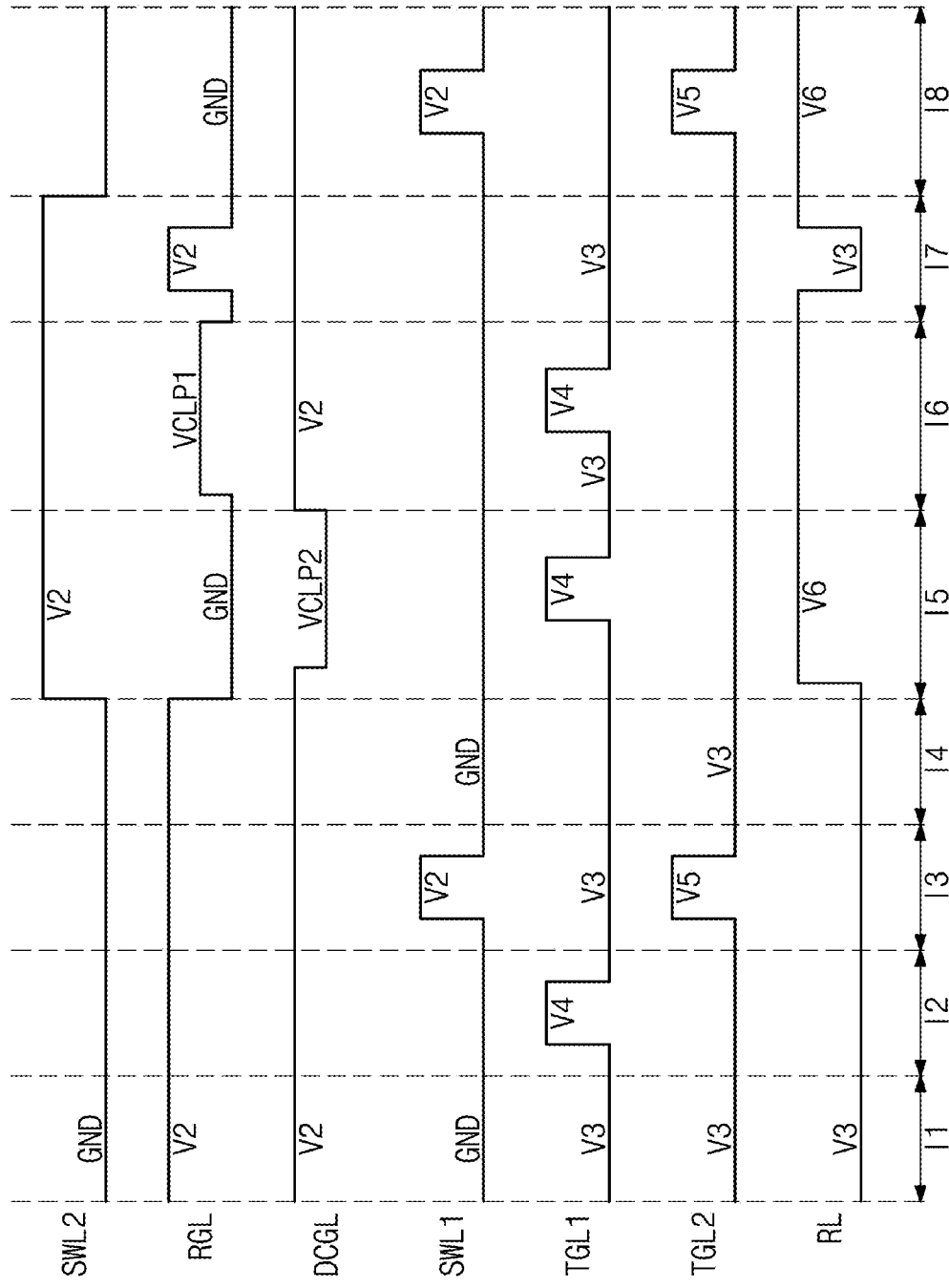
FIG. 11 is a diagram illustrating another example of signals that a row driver applies to a pixel according to some example embodiments of the present inventive concepts.

FIG. 11 is a diagram illustrating another example of signals that the row driver 120 applies to the pixel PX according to some example embodiments of the present inventive concepts. Referring to FIGS. 1, 2, and 11, the first interval I1, the second interval I2, the third interval I3, the fourth interval I4, the seventh interval I7, and the eighth interval I8 are identical to the first interval I1, the second interval I2, the third interval I3, the fourth interval I4, the seventh interval I7, and the eighth interval I8 described with reference to FIG. 5. Thus, additional description will be omitted to avoid redundancy. The features described with reference to the first interval I1, the second interval I2, the third interval I3, the fourth interval I4, the seventh interval I7, and the eighth interval I8 of FIG. 5 may be identically applied to the first interval I1, the second interval I2, the third interval I3, the fourth interval I4, the seventh interval I7, and the eighth interval I8 of FIG. 11.

A fifth interval I5 may be a high conversion gain (HCG) readout interval of the first photodiode PD1. In the fifth interval I5, the row driver 120 may apply the second voltage V2 to the second switch line SWL2, may apply the ground voltage GND to the reset gate line RGL, may apply the second clamp voltage VCLP2 to the dynamic conversion gain line DCGL, may apply the ground voltage GND to the first switch line SWL1, may apply the third voltage V3 to the first transfer gate line TGL1 after applying the fourth voltage V4 to the first transfer gate line TGL1, may apply the third voltage V3 to the second transfer gate line TGL2, and may apply the sixth voltage V6 to the row line RL.

The dynamic conversion gain transistor DCG may be set to the quasi-on state by the second clamp voltage VCLP2. The reset gate transistor RG may be turned off by the ground voltage GND. The first transfer gate transistor TG1 may be turned on by the fourth voltage V4 and may dump electrons of the first photodiode PD1 to the first floating diffusion node FD1. The dynamic conversion gain transistor DCG may be set to the quasi-on state and may leak out a current exceeding the potential barrier thereof. The selection gate transistor SG may be turned on by the sixth voltage V6 and may transfer a voltage change of the first floating diffusion node FD1 to the column line CL.

A sixth interval I6 may be a low conversion gain (LCG) readout interval of the first photodiode PD1. In the sixth interval I6, the row driver 120 may apply the second voltage V2 to the second switch line SWL2, may apply the first clamp voltage VCLP1 to the reset gate line RGL, may apply the second voltage V2 to the dynamic conversion gain line DCGL, may apply the ground voltage GND to the first switch line SWL1, may apply the third voltage V3 to the first transfer gate line TGL1 after applying the fourth voltage V4 to the first transfer gate line TGL1, may apply the third voltage V3 to the second transfer gate line TGL2, and may apply the sixth voltage V6 to the row line RL.

The dynamic conversion gain transistor DCG may be turned on by the second voltage V2 and may increase a capacitance of the first floating diffusion node FD1. The reset gate transistor RG may be set to the quasi-on state by the first clamp voltage VCLP1 and may leak out electrons exceeding the potential barrier. The first transfer gate transistor TG1 may be turned on by the fourth voltage V4 and may dump electrons of the first photodiode PD1 to the first floating diffusion node FD1. The selection gate transistor SG may be turned on by the sixth voltage V6 and may transfer a voltage change of the first floating diffusion node FD1 to the column line CL.

In some example embodiments, including the example embodiments shown in FIG. 11, the image sensor 100 may clamp the voltage of the first floating diffusion node FD1 by using the dynamic conversion gain transistor DCG in the high conversion gain readout interval of the first photodiode PD1, that is, in the fifth interval I5. Also, the image sensor 100 may clamp the voltage of the first floating diffusion node FD1 by using the reset gate transistor RG in the low conversion gain readout interval of the first photodiode PD1, that is, in the sixth interval I6.

Potential barriers of the fifth interval I5 of FIG. 11 may be identical to those described with reference to FIG. 10. Potential barriers of the sixth interval I6 of FIG. 11 may be identical to those described with reference to FIG. 8. Thus, additional description will be omitted to avoid redundancy.

In FIGS. 5 to 11, that the first voltage V1, the second voltage V2, the third voltage V3, the fourth voltage V4, the fifth voltage V5, and the sixth voltage V6 are relatively high or low and the first to sixth voltages V1 to V6 are a positive voltage or a negative voltage is described, but this is only an example. The relative high and low levels of the first voltage V1, the second voltage V2, the third voltage V3, the fourth voltage V4, the fifth voltage V5, and the sixth voltage V6, and whether the first to sixth voltages V1 to V6 are a positive voltage or a negative voltage may be variously changed or modified.

In some example embodiments, with regard to the pixel PX of FIG. 2, the description is given as the first node of the reset gate transistor RG is connected with the node to which the first voltage V1 is applied (e.g., the first voltage node VN1) and the first node of the source follower transistor SF is also connected with the node to which the first voltage V1 is applied (e.g., the first voltage node VN1). However, the first node of the reset gate transistor RG and the first node of the source follower transistor SF may be respectively connected with different nodes to which different voltages are applied.

Figure 12:
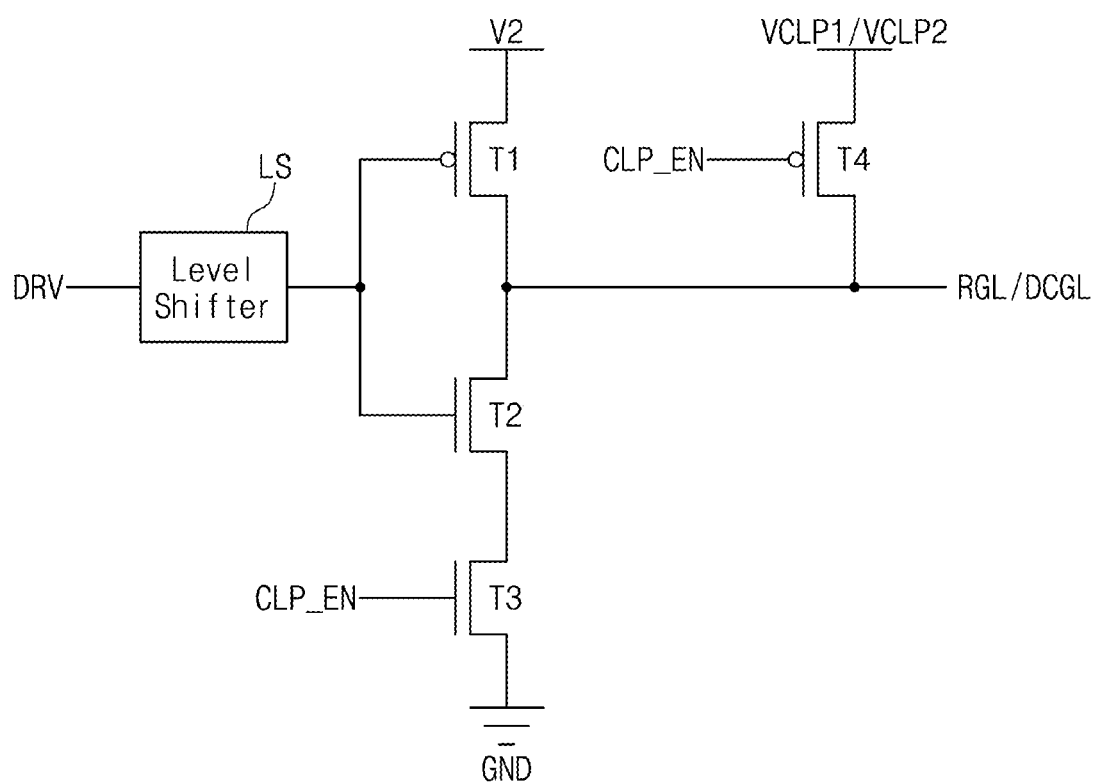
FIG. 12 is a diagram illustrating an example of some components of a row driver supplying a voltage to a reset gate line or a dynamic conversion gain line according to some example embodiments of the present inventive concepts.

FIG. 12 is a diagram illustrating an example of some components of the row driver 120 supplying a voltage to the reset gate line RGL or the dynamic conversion gain line DCGL according to some example embodiments of the present inventive concepts. Referring to FIG. 12, the row driver 120 may include a first transistor T1, a second transistor T2, a third transistor T3, a fourth transistor T4, and a level shifter LS.

The first transistor T1, the second transistor T2, and the third transistor T3 may be connected in series between the second voltage node to which the second voltage V2 is applied and the ground node to which the ground voltage GND is applied. The first transistor T1 may be a PMOS transistor (e.g., a first PMOS transistor), and the second transistor T2 and the third transistor T3 may be NMOS transistors (e.g., first and second NMOS transistors).

An output of the level shifter LS may be connected with gates of the first transistor T1 and the second transistor T2. The level shifter LS may convert a driving signal DRV (e.g., driving voltage) for driving the reset gate line RGL or the dynamic conversion gain line DCGL into a signal of a voltage domain of the second voltage V2, such that the gates of the first and second transistors T2 may each be configured to receive the driving voltage.

A clamp enable signal CLP_EN may be transferred to a gate of the third transistor T3, such that the gate of the third transistor T3 may be understood to be configured to receive the clamp enable signal CLP_EN. The first transistor T1, the second transistor T2, and the third transistor T3 may constitute an inverter that is activated when the clamp enable signal CLP_EN is at the high level and is deactivated when the clamp enable signal CLP_EN is at the low level. A node between the first transistor T1 and the second transistor T2 may be connected with the reset gate line RGL or the dynamic conversion gain line DCGL as an output of the inverter.

The fourth transistor T4 may be connected between a voltage node to which the first clamp voltage VCLP1 or the second clamp voltage VCLP2 is applied and the reset gate line RGL or the dynamic conversion gain line DCGL. The clamp enable signal CLP_EN may be transferred to a gate of the fourth transistor T4, such that the gate of the fourth transistor T4 may be understood to be configured to receive the clamp enable signal CLP_EN. The fourth transistor T4 may be a PMOS transistor (e.g., a second PMOS transistor).

When the clamp enable signal CLP_EN is at the low level, the fourth transistor T4 may apply the first clamp voltage VCLP1 or the second clamp voltage VCLP2 to the reset gate line RGL or the dynamic conversion gain line DCGL. When the clamp enable signal CLP_EN is at the high level, the fourth transistor T4 may be turned off.

In FIGS. 3 and 12, some example embodiments in which the clamp voltage VCLP1 or VCLP2 is applied to the dynamic conversion gain transistor DCG or the reset gate transistor RG of the pixel PX of FIG. 2 such that the current source CS connected with the column line CL is prevented from being out of the saturation state, or such state outside of the saturation state is reduced or minimized, and the band noise is prevented from occurring, or such occurrence of band noise is reduced or minimized, is described.

According to some example embodiments of the present inventive concepts, by lowering the threshold voltage of the dynamic conversion gain transistor DCG or the reset gate transistor RG, even though not the clamp voltage VCLP1 or VCLP2 but the ground voltage is applied to the gate of the dynamic conversion gain transistor DCG or the reset gate transistor RG, there may occur a phenomenon similar to that occurring when the clamp voltage VCLP1 or VCLP2 is applied to the gate of the dynamic conversion gain transistor DCG or the reset gate transistor RG.

For example, the threshold voltage of the dynamic conversion gain transistor DCG or the reset gate transistor RG may be lowered by implementing the dynamic conversion gain transistor DCG or the reset gate transistor RG with a native transistor or a depletion mode transistor.

When the threshold voltage of the dynamic conversion gain transistor DCG or the reset gate transistor RG is lowered, as described with reference to FIG. 6, 8, or 10, the dynamic conversion gain transistor DCG or the reset gate transistor RG may be set to the quasi-on state by the ground voltage, and thus, the potential barrier of the dynamic conversion gain transistor DCG or the reset gate transistor RG may decrease. Accordingly, electrons, the amount of which exceeds the potential barrier of the dynamic conversion gain transistor DCG or the reset gate transistor RG, may be leaked out to the first node N1 or the node to which the first voltage V1 is applied.

In some example embodiments, the threshold voltage of the dynamic conversion gain transistor DCG or the reset gate transistor RG of the pixel PX may be implemented to be lower than a threshold voltage of the remaining transistors, and a clamp voltage may be applied to the dynamic conversion gain transistor DCG or the reset gate transistor RG as described with reference to FIGS. 3 to 12.

That is, by lowering the threshold voltage of the dynamic conversion gain transistor DCG or the reset gate transistor RG, by applying the clamp voltage to the dynamic conversion gain transistor DCG or the reset gate transistor RG, or by lowering the threshold voltage of the dynamic conversion gain transistor DCG or the reset gate transistor RG and applying the clamp voltage thereto, the dynamic conversion gain transistor DCG or the reset gate transistor RG may be set to the quasi-on state. As the dynamic conversion gain transistor DCG or the reset gate transistor RG is set to the quasi-on state, electrons accumulated at the first floating diffusion node FD1 or the first node N1 may be leaked out.

In some example embodiments, a way to apply a clamp voltage to a transistor and a way to lower a threshold voltage of a transistor may be applied to different transistors. For example, the dynamic conversion gain transistor DCG may be implemented to have a low threshold voltage. The dynamic conversion gain transistor DCG may be set to the quasi-on state in response to that the ground voltage is applied to the gate of the dynamic conversion gain transistor DCG.

The reset gate transistor RG connected with the node to which the first voltage V1 is applied may be set to the quasi-on state by using the clamp voltage. At a required time, the row driver 120 may apply the clamp voltage to the gate of the reset gate transistor RG such that the reset gate transistor RG is set to the quasi-on state.

Figure 13:
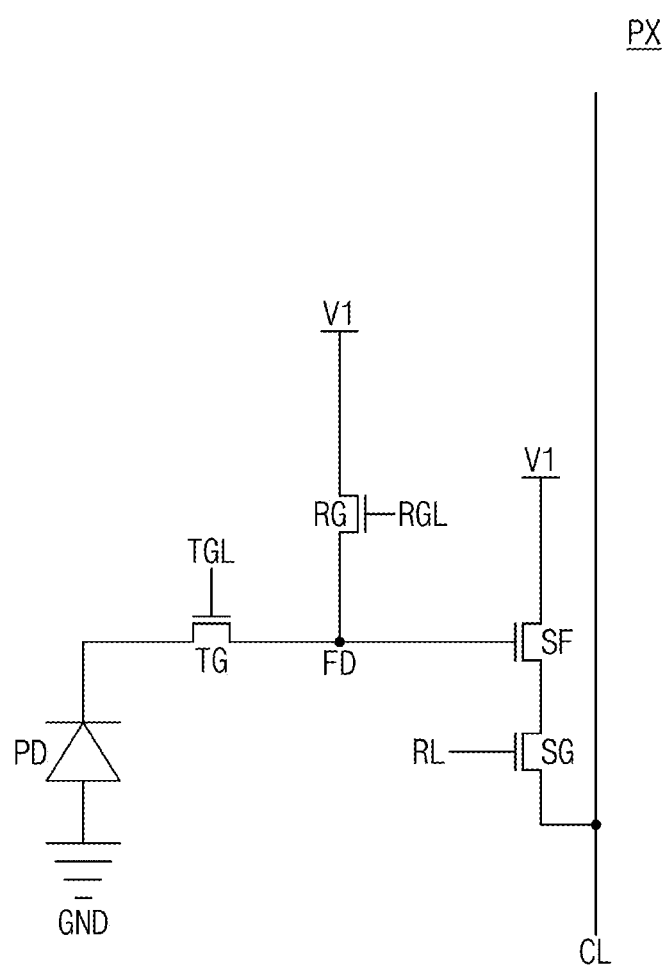
FIG. 13 is a diagram illustrating a pixel according to some example embodiments of the present inventive concepts.

FIG. 13 is a diagram illustrating the pixel PX according to some example embodiments of the present inventive concepts. Referring to FIGS. 1 and 13, the pixel PX may include a photodiode PD, a transfer gate transistor TG, a source follower transistor SF, a selection gate transistor SG, and a reset gate transistor RG.

The photodiode PD may be connected between the ground node to which the ground voltage GND is applied and the transfer gate transistor TG. The transfer gate transistor TG may include a gate connected with a transfer gate line TGL, a first node connected with the photodiode PD, and a second node connected with a floating diffusion node FD.

The source follower transistor SF may include a gate connected with the floating diffusion node FD, a first node connected with a first voltage node to which a first voltage V1 is applied, and a second node connected with a first node of the selection gate transistor SG.

The selection gate transistor SG may include a gate connected with a corresponding row line among the first to m-th row lines RL1 to RLm, the first node connected with the second node of the source follower transistor SF, and a second node connected with a corresponding column line among the first to n-th column lines CL1 to CLn.

The reset gate transistor RG may include a gate connected with a reset gate line RGL, a first node connected with the first voltage node to which the first voltage V1 is applied, and a second node connected with the floating diffusion node FD.

Some example embodiments of the present inventive concepts may be applied to the pixel PX of FIG. 13. For example, while the row driver 120 turns on the transfer gate transistor TG, the row driver 120 may apply a clamp voltage (e.g., the first clamp voltage VCLP1 or the second clamp voltage VCLP2) to the reset gate line RGL. The reset gate transistor RG may be set to the quasi-on state by the clamp voltage. The reset gate transistor RG may clamp the voltage of the floating diffusion node FD by leaking out electrons exceeding a potential barrier thereof.

Figure 14:
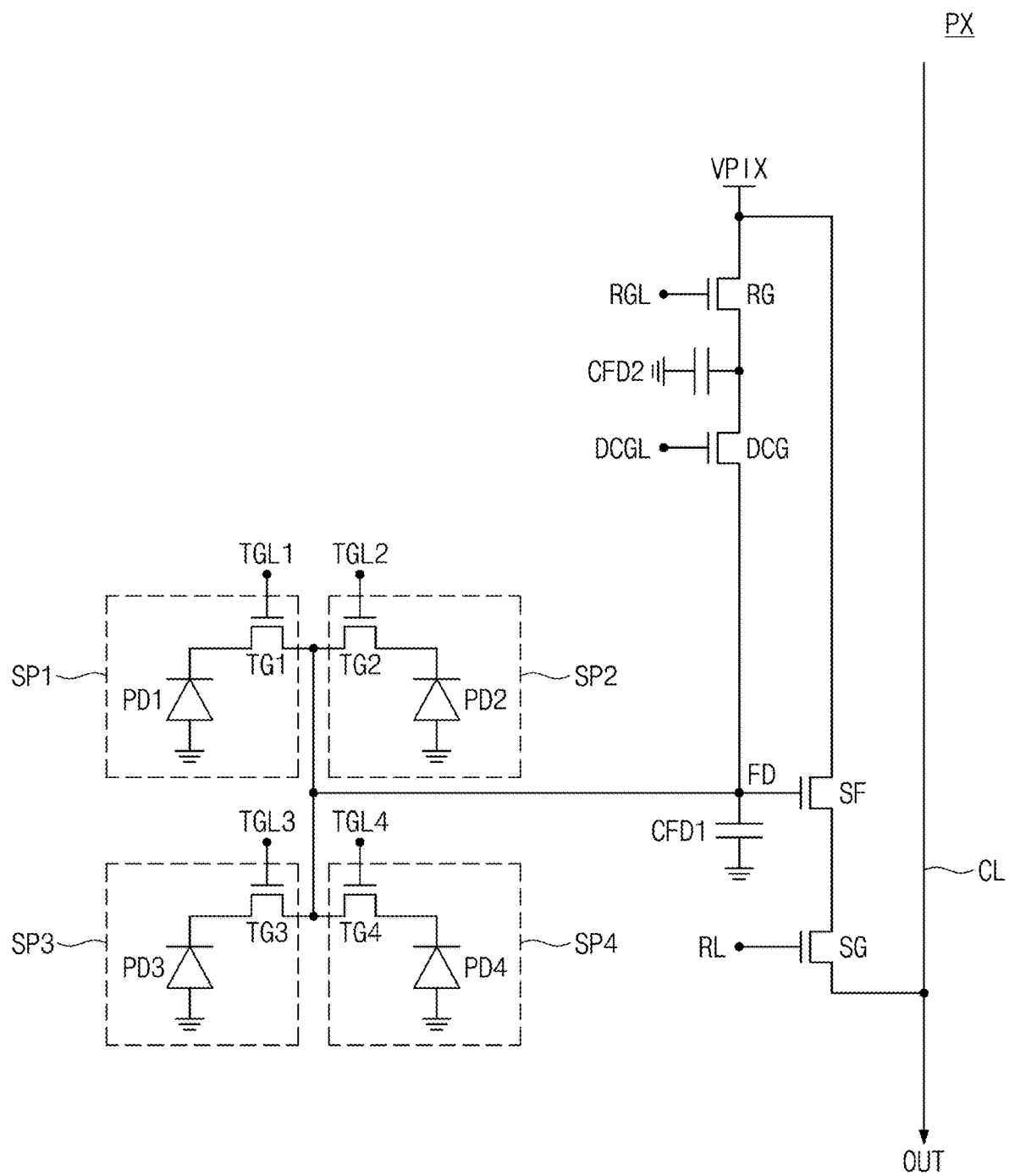
FIG. 14 is a diagram illustrating a pixel according to some example embodiments of the present inventive concepts.

FIG. 14 is a diagram illustrating the pixel PX according to some example embodiments of the present inventive concepts. Referring to FIGS. 1 and 14, the pixel PX may include a first sub-pixel SP1, a second sub-pixel SP2, a third sub-pixel SP3, a fourth sub-pixel SP4, a source follower transistor SF, a selection gate transistor SG, a dynamic conversion gain transistor DCG, a reset gate transistor RG, a first capacitor CFD1, and a second capacitor CFD2.

The first sub-pixel SP1 may include a first photodiode PD1 and a first transfer gate transistor TG1. The first photodiode PD1 may be connected between a ground node to which a ground voltage GND is applied and the first transfer gate transistor TG1. The first transfer gate transistor TG1 may include a gate connected with a first transfer gate line TGL1, a first node connected with the first photodiode PD1, and a second node connected with the floating diffusion node FD.

The second sub-pixel SP2 may include a second photodiode PD2 and a second transfer gate transistor TG2. The second photodiode PD2 may be connected between the ground node to which the ground voltage GND is applied and the second transfer gate transistor TG2. The second transfer gate transistor TG2 may include a gate connected with a second transfer gate line TGL2, a first node connected with the second photodiode PD2, and a second node connected with the floating diffusion node FD.

The third sub-pixel SP3 may include a third photodiode PD3 and a third transfer gate transistor TG3. The third photodiode PD3 may be connected between the ground node to which the ground voltage GND is applied and the third transfer gate transistor TG3. The third transfer gate transistor TG3 may include a gate connected with a third transfer gate line TGL3, a first node connected with the third photodiode PD3, and a second node connected with the floating diffusion node FD.

The fourth sub-pixel SP4 may include a fourth photodiode PD4 and a fourth transfer gate transistor TG4. The fourth photodiode PD4 may be connected between the ground node to which the ground voltage GND is applied and the fourth transfer gate transistor TG4. The fourth transfer gate transistor TG4 may include a gate connected with a fourth transfer gate line TGL4, a first node connected with the fourth photodiode PD4, and a second node connected with the floating diffusion node FD.

The source follower transistor SF may include a gate connected with the floating diffusion node FD, a first node connected with a first voltage node to which a first voltage V1 is applied, and a second node connected with a first node of the selection gate transistor SG.

The selection gate transistor SG may include a gate connected with a corresponding row line among the first to m-th row lines RL1 to RLm, the first node connected with the second node of the source follower transistor SF, and a second node connected with a corresponding column line among the first to n-th column lines CL1 to CLn.

The dynamic conversion gain transistor DCG may include a gate connected with a dynamic conversion gain line DCGL, a first node connected with a second node of the reset gate transistor RG, and a second node connected with the floating diffusion node FD.

The reset gate transistor RG may include a gate connected with a reset gate line RGL, a first node connected with the first voltage node to which the first voltage V1 is applied, and the second node connected with the floating diffusion node FD.

The first capacitor CFD1 may be connected with the floating diffusion node FD and increase a capacitance of the floating diffusion node FD. In some example embodiments, the first capacitor CFD1 may be omitted. The second capacitor CFD2 may be connected with a node between the dynamic conversion gain transistor DCG and the reset gate transistor RG to provide a capacitance. In some example embodiments, the second capacitor CFD2 may be omitted.

Some example embodiments of the present inventive concepts may be applied to the pixel PX of FIG. 14. For example, while the row driver 120 turns on at least one of the first transfer gate transistor TG1, the second transfer gate transistor TG2, the third transfer gate transistor TG3, and the fourth transfer gate transistor TG4, the row driver 120 may apply a clamp voltage (e.g., the first clamp voltage VCLP1 or the second clamp voltage VCLP2) to the reset gate line RGL or the dynamic conversion gain line DCGL. In some example embodiments, voltages that are applied to the dynamic conversion gain line DCGL and the reset gate line RGL may be adjusted as described with reference to the fifth interval I5 and the sixth interval I6 of FIGS. 5, 7, 9, and 11.

Figure 15:
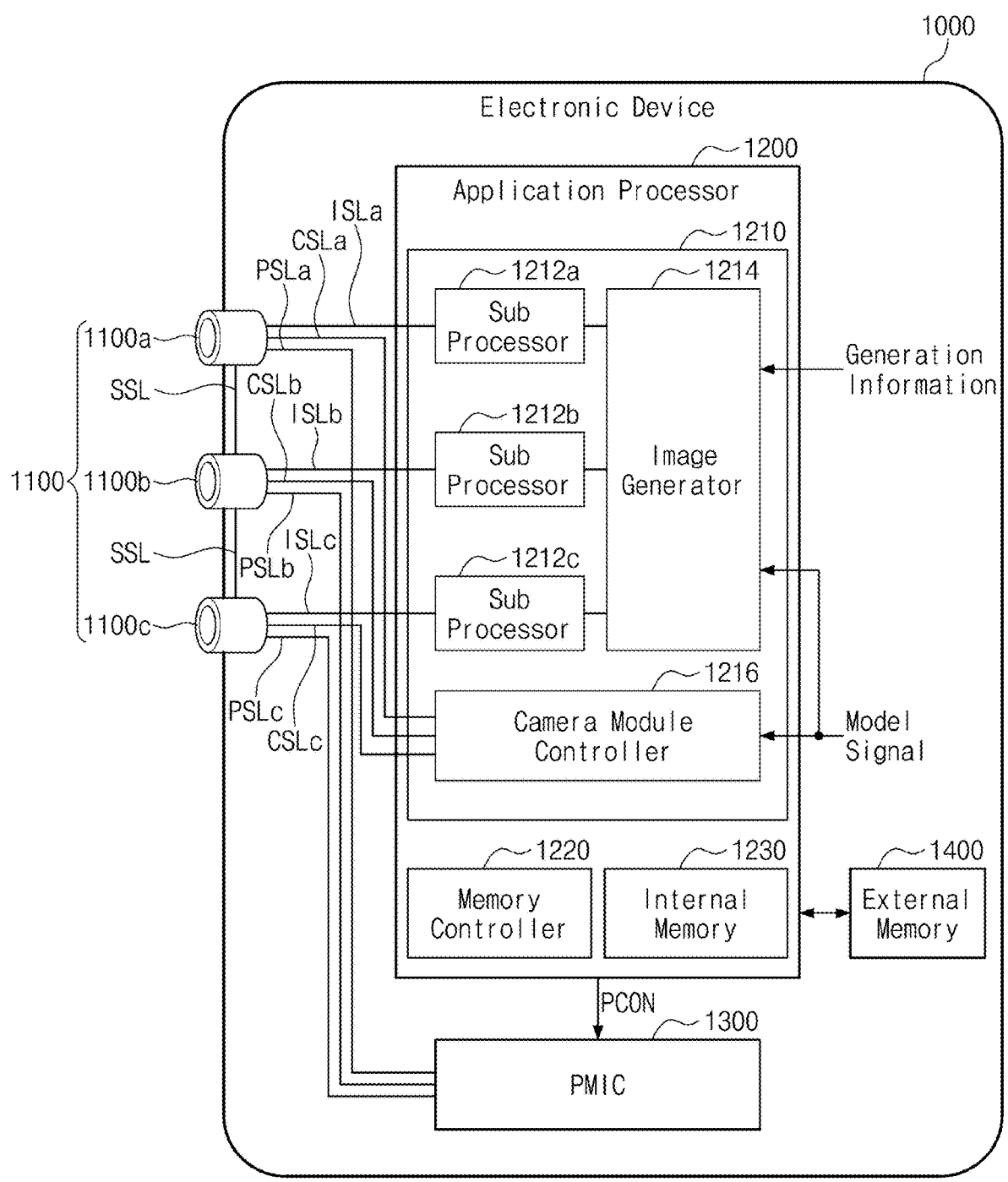
FIG. 15 is a block diagram of an electronic device including a multi-camera module according to some example embodiments of the present inventive concepts.
Figure 16:
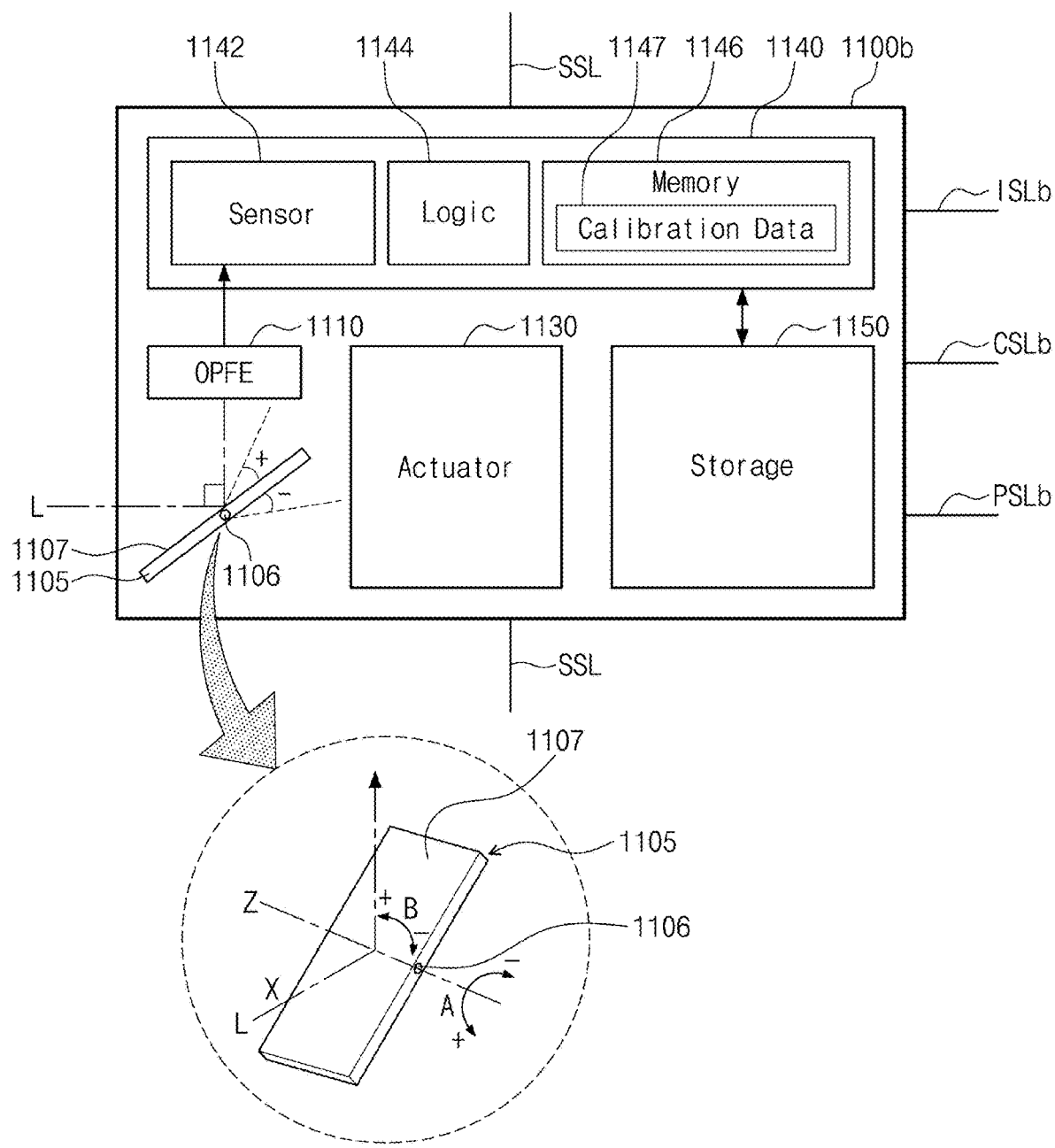
FIG. 16 is a detailed block diagram of a camera module of FIG. 15 according to some example embodiments of the present inventive concepts.

FIG. 15 is a block diagram of an electronic device including a multi-camera module according to some example embodiments of the present inventive concepts. FIG. 16 is a block diagram illustrating a camera module of FIG. 15 in detail according to some example embodiments of the present inventive concepts.

Referring to FIG. 15, an electronic device 1000 may include a camera module group 1100, an application processor 1200, a PMIC 1300, and an external memory 1400.

The camera module group 1100 may include a plurality of camera modules 1100a, 1100b, and 1100c, also referred to herein interchangeably as cameras, camera devices, or the like. An electronic device including three camera modules 1100a, 1100b, and 1100c is illustrated in FIG. 15, but the present inventive concepts are not limited thereto. In some example embodiments, the camera module group 1100 may be modified to include only two camera modules. Also, in some example embodiments, the camera module group 1100 may be modified to include "n" camera modules (n being a natural number of 4 or more). For example, each of the plurality of camera modules 1100a, 1100b, and 1100c of the camera module group 1100 may include the image sensor 100 of FIG. 1.

Below, a detailed configuration of the camera module 1100b will be more fully described with reference to FIG. 16, but the following description may be equally applied to the remaining camera modules 1100a and 1100c.

Referring to FIG. 16, the camera module 1100b may include a prism 1105, an optical path folding element (OPFE) 1110, an actuator 1130, an image sensing device 1140, and storage 1150.

The prism 1105 may include a reflecting plane 1107 of a light reflecting material and may change a path of a light "L" incident from the outside.

In some example embodiments, the prism 1105 may change a path of the light "L" incident in a first direction (X) to a second direction (Y) perpendicular to the first direction (X), Also, the prism 1105 may change the path of the light "L" incident in the first direction (X) to the second direction (Y) perpendicular to the first (X-axis) direction by rotating the reflecting plane 1107 of the light reflecting material in direction "A" about a central axis 1106 or rotating the central axis 1106 in direction "B". In this case, the OPFE 1110 may move in a third direction (Z) perpendicular to the first direction (X) and the second direction (Y).

In some example embodiments, as illustrated in FIG. 16, a maximum rotation angle of the prism 1105 in direction "A" may be equal to or smaller than 15 degrees in a positive A direction and may be greater than 15 degrees in a negative A direction, but the present inventive concepts are not limited thereto.

In some example embodiments, the prism 1105 may move within approximately 20 degrees in a positive or negative B direction, between 10 degrees and 20 degrees, or between 15 degrees and 20 degrees; here, the prism 1105 may move at the same angle in the positive or negative B direction or may move at a similar angle within approximately 1 degree.

In some example embodiments, the prism 1105 may move the reflecting plane 1107 of the light reflecting material in the third direction (e.g., Z direction) parallel to a direction in which the central axis 1106 extends.

The OPFE 1110 may include optical lenses composed of "m" groups (m being a natural number), for example. Here, "m" lens may move in the second direction (Y) to change an optical zoom ratio of the camera module 1100b. For example, when a default optical zoom ratio of the camera module 1100b is "Z", the optical zoom ratio of the camera module 1100b may be changed to an optical zoom ratio of 3Z, 5Z, or 5Z or more by moving "m" optical lens included in the OPFE 1110.

The actuator 1130 may move the OPFE 1110 or an optical lens (hereinafter referred to as an "optical lens") to a specific location. For example, the actuator 1130 may adjust a location of an optical lens such that an image sensor 1142 is placed at a focal length of the optical lens for accurate sensing.

The image sensing device 1140 may include the image sensor 1142, control logic 1144, and a memory 1146. The image sensor 1142 may sense an image of a sensing target by using the light "L" provided through an optical lens.

The control logic 1144 may control overall operations of the camera module 1100b. For example, the control logic 1144 may control an operation of the camera module 1100b based on a control signal provided through a control signal line CSLb.

The memory 1146 may store information, which is necessary for an operation of the camera module 1100b, such as calibration data 1147. The calibration data 1147 may include information necessary for the camera module 1100b to generate image data by using the light "L" provided from the outside. The calibration data 1147 may include, for example, information about the degree of rotation described above, information about a focal length, information about an optical axis, etc. In the case where the camera module 1100b is implemented in the form of a multi-state camera in which a focal length varies depending on a location of an optical lens, the calibration data 1147 may include a focal length value for each location (or state) of the optical lens and information about auto focusing.

The storage 1150 may store image data sensed through the image sensor 1142. The storage 1150 may be disposed outside the image sensing device 1140 and may be implemented in a shape where the storage 1150 and a sensor chip constituting the image sensing device 1140 are stacked. In some example embodiments, the storage 1150 may be implemented with an electrically erasable programmable read only memory (EEPROM), but the present inventive concepts are not limited thereto.

Figure 17:
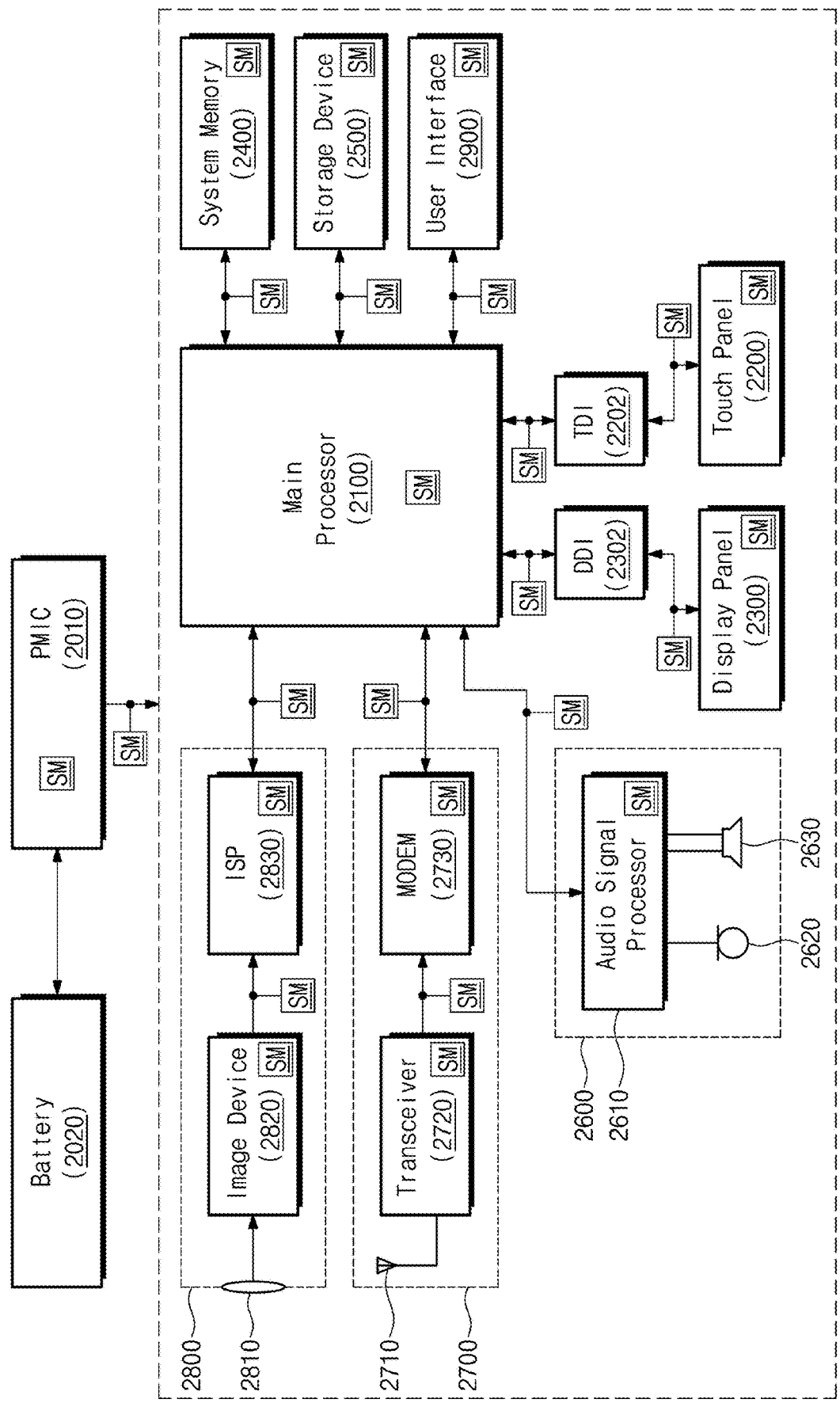
FIG. 17 is a block diagram illustrating an electronic device to which an image sensor or a camera module according to some example embodiments of the present inventive concepts are applied.

Referring together to FIGS. 16 and 17, in some example embodiments, each of the plurality of camera modules 1100a, 1100b, and 1100c may include the actuator 1130. As such, the same calibration data 1147 or different calibration data 1147 may be included in the plurality of camera modules 1100a, 1100b, and 1100c depending on operations of the actuators 1130 therein.

In some example embodiments, one camera module (e.g., 1100b) among the plurality of camera modules 1100a, 1100b, and 1100c may be a folded lens shape of camera module in which the prism 1105 and the OPFE 1110 described above are included, and the remaining camera modules (e.g., 1100a and 1100c) may be a vertical shape of camera module in which the prism 1105 and the OPFE 1110 described above are not included; however, the present inventive concepts are not limited thereto.

In some example embodiments, one camera module (e.g., 1100c) among the plurality of camera modules 1100a, 1100b, and 1100c may be, for example, a vertical shape of depth camera extracting depth information by using an infrared ray (IR). In this case, the application processor 1200 may merge image data provided from the depth camera and image data provided from any other camera module (e.g., 1100a or 1100b) and may generate a three-dimensional (3D) depth image.

In some example embodiments, at least two camera modules (e.g., 1100a and 1100b) among the plurality of camera modules 1100a, 1100b, and 1100c may have different fields of view. In this case, the at least two camera modules (e.g., 1100a and 1100b) among the plurality of camera modules 1100a, 1100b, and 1100c may include different optical lens, but the present inventive concepts are not limited thereto.

Also, in some example embodiments, fields of view of the plurality of camera modules 1100a, 1100b, and 1100c may be different. In this case, the plurality of camera modules 1100a, 1100b, and 1100c may include different optical lens, not limited thereto.

In some example embodiments, the plurality of camera modules 1100a, 1100b, and 1100c may be disposed to be physically separated from each other. That is, the plurality of camera modules 1100a, 1100b, and 1100c may not use a sensing area of one image sensor 1142, but the plurality of camera modules 1100a, 1100b, and 1100c may include independent image sensors 1142 therein, respectively.

Returning to FIG. 15, the application processor 1200 may include an image processing device 1210, a memory controller 1220, and an internal memory 1230. The application processor 1200 may be implemented to be separated from the plurality of camera modules 1100a, 1100b, and 1100c. For example, the application processor 1200 and the plurality of camera modules 1100a, 1100b, and 1100c may be implemented with separate semiconductor chips.

The image processing device 1210 may include a plurality of sub image processors 1212a, 1212b, and 1212c, an image generator 1214, and a camera module controller 1216.

The image processing device 1210 may include the plurality of sub image processors 1212a, 1212b, and 1212c, the number of which corresponds to the number of the plurality of camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. For example, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, by using a camera serial interface (CSI) based on the MIMI (Mobile Industry Processor Interface), but the present inventive concepts are not limited thereto.

Meanwhile, in some example embodiments, one sub image processor may be disposed to correspond to a plurality of camera modules. For example, the sub image processor 1212a and the sub image processor 1212c may be integrally implemented, not separated from each other as illustrated in FIG. 15; in this case, one of the pieces of image data respectively provided from the camera module 1100a and the camera module 1100c may be selected through a selection element (e.g., a multiplexer), and the selected image data may be provided to the integrated sub image processor.

The image data respectively provided to the sub image processors 1212a, 1212b, and 1212c may be provided to the image generator 1214. The image generator 1214 may generate an output image by using the image data respectively provided from the sub image processors 1212a, 1212b, and 1212c, depending on image generating information Generating Information or a mode signal.

In detail, the image generator 1214 may generate the output image by merging at least a portion of the image data respectively generated from the camera modules 1100a, 1100b, and 1100c having different fields of view, depending on the image generating information Generating Information or the mode signal. Also, the image generator 1214 may generate the output image by selecting one of the image data respectively generated from the camera modules 1100a, 1100b, and 1100c having different fields of view, depending on the image generating information Generating Information or the mode signal.

In some example embodiments, the image generating information Generating Information may include a zoom signal or a zoom factor. Also, in some example embodiments, the mode signal may be, for example, a signal based on a mode selected from a user.

In the case where the image generating information Generating Information is the zoom signal (or zoom factor) and the camera modules 1100a, 1100b, and 1100c have different visual fields of view, the image generator 1214 may perform different operations depending on a kind of the zoom signal. For example, in the case where the zoom signal is a first signal, the image generator 1214 may merge the image data output from the camera module 1100a and the image data output from the camera module 1100c and may generate the output image by using the merged image signal and the image data output from the camera module 1100b that is not used in the merging operation. In the case where the zoom signal is a second signal different from the first signal, without the image data merging operation, the image generator 1214 may select one of the image data respectively output from the camera modules 1100a, 1100b, and 1100c and may output the selected image data as the output image. However, the present inventive concepts are not limited thereto, and a way to process image data may be modified without limitation if necessary.

In some example embodiments, the image generator 1214 may generate merged image data having an increased dynamic range by receiving a plurality of image data of different exposure times from at least one of the plurality of sub image processors 1212a, 1212b, and 1212c and performing high dynamic range (HDR) processing on the plurality of image data.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

One of the plurality of camera modules 1100a, 1100b, and 1100c may be designated as a master camera (e.g., 1100b) depending on the image generating information Generating Information including a zoom signal or the mode signal, and the remaining camera modules (e.g., 1100a and 1100c) may be designated as a slave camera. The above designation information may be included in the control signals, and the control signals including the designation information may be respectively provided to the corresponding camera modules 1100a, 1100b, and 1100c through the control signal lines CSLa, CSLb, and CSLc separated from each other.

Camera modules operating as a master and a slave may be changed depending on the zoom factor or an operating mode signal. For example, in the case where the field of view of the camera module 1100a is wider than the field of view of the camera module 1100b and the zoom factor indicates a low zoom ratio, the camera module 1100b may operate as a master, and the camera module 1100a may operate as a slave. In contrast, in the case where the zoom factor indicates a high zoom ratio, the camera module 1100a may operate as a master, and the camera module 1100b may operate as a slave.

In some example embodiments, the control signal provided from the camera module controller 1216 to each of the camera modules 1100a, 1100b, and 1100c may include a sync enable signal. For example, in the case where the camera module 1100b is used as a master camera and the camera modules 1100a and 1100c are used as a slave camera, the camera module controller 1216 may transmit the sync enable signal to the camera module 1100b. The camera module 1100b that is provided with sync enable signal may generate a sync signal based on the provided sync enable signal and may provide the generated sync signal to the camera modules 1100a and 1100c through a sync signal line SSL. The camera module 1100b and the camera modules 1100a and 1100c may be synchronized with the sync signal to transmit image data to the application processor 1200.

In some example embodiments, the control signal provided from the camera module controller 1216 to each of the camera modules 1100a, 1100b, and 1100c may include mode information according to the mode signal. Based on the mode information, the plurality of camera modules 1100a, 1100*b*, and 1100*c* may operate in a first operating mode and a second operating mode with regard to a sensing speed.

In the first operating mode, the plurality of camera modules 1100*a*, 1100*b*, and 1100*c* may generate image signals at a first speed (e.g., may generate image signals of a first frame rate), may encode the image signals at a second speed (e.g., may encode the image signal of a second frame rate higher than the first frame rate), and transmit the encoded image signals to the application processor 1200. In this case, the second speed may be 30 times or less the first speed.

The application processor 1200 may store the received image signals, that is, the encoded image signals in the internal memory 1230 provided therein or the external memory 1400 placed outside the application processor 1200. Afterwards, the application processor 1200 may read and decode the encoded image signals from the internal memory 1230 or the external memory 1400 and may display image data generated based on the decoded image signals. For example, the corresponding one among sub image processors 1212*a*, 1212*b*, and 1212*c* of the image processing device 1210 may perform decoding and may also perform image processing on the decoded image signal.

In the second operating mode, the plurality of camera modules 1100*a*, 1100*b*, and 1100*c* may generate image signals at a third speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the internal memory 1230 or the external memory 1400.

The PMIC 1300 may supply electrical power, for example, power supply voltages to the plurality of camera modules 1100*a*, 1100*b*, and 1100*c*, respectively. For example, under control of the application processor 1200, the PMIC 1300 may supply a first power to the camera module 1100*a* through a power signal line PSLa, may supply a second power to the camera module 1100*b* through a power signal line PSLb, and may supply a third power to the camera module 1100*c* through a power signal line PSLc.

In response to a power control signal PCON from the application processor 1200, the PMIC 1300 may generate a power corresponding to each of the plurality of camera modules 1100*a*, 1100*b*, and 1100*c* and may adjust a level of the power. The power control signal PCON may include a power adjustment signal for each operating mode of the plurality of camera modules 1100*a*, 1100*b*, and 1100*c*. For example, the operating mode may include a low-power mode. In this case, the power control signal PCON may include information about a camera module operating in the low-power mode and a set power level. Levels of the powers respectively provided to the plurality of camera modules 1100*a*, 1100*b*, and 1100*c* may be identical to each other or may be different from each other. Also, a level of a power may be dynamically changed.

In some example embodiments, the image sensor 100 described with reference to FIGS. 1 to 14 may correspond to the image sensor 1142 of FIG. 16. While dumping electrons accumulated in a photodiode to a floating diffusion node through a transfer gate, the image sensor 1142 may clamp a voltage of the floating diffusion node by applying not a ground voltage but a clamp voltage to at least one transistor connected with the floating diffusion node, for example, a dynamic conversion gain transistor, a reset gate transistor, or the dynamic conversion gain transistor and the reset gate transistor. Accordingly, a band noise may be prevented from occurring in image data, or such occurrence may be reduced or minimized, when a strong light is incident (e.g., in response to high-intensity light being incident on the image sensor 1142.

FIG. 17 is a block diagram illustrating an electronic device 2000 including an image sensor 100 or the camera module 1100*b* according to some example embodiments of the present inventive concepts. Referring to FIG. 17, the electronic device 2000 may include a main processor 2100, a touch panel 2200, a touch driver integrated circuit (TDI) 2202, a display panel 2300, a display driver integrated circuit (DDI) 2302, a system memory 2400, a storage device 2500, an audio processor 2600, a communication block 2700, an image processor 2800, and a user interface 2900. In some example embodiments, the electronic device 2000 may be one of various electronic devices such as a personal computer, a laptop computer, a server, a workstation, a portable communication terminal, a personal digital assistant (PDA), a portable media player (PMP), a digital camera, a smartphone, a tablet computer, and a wearable device. The electronic device 2000 may be an automotive system (e.g., an autonomous driving system or an infotainment system) mount in a vehicle such as a car, an electrical vehicle, an autonomous driving vehicle.

The main processor 2100 may control an overall operation of the electronic device 2000. The main processor 2100 may control/manage operations of the components of the electronic device 2000. The main processor 2100 may perform various operations for the purpose of operating the electronic device 2000. The touch panel 2200 may be configured to sense a touch input from a user under control of the touch driver integrated circuit 2202. The display panel 2300 may be configured to display image information under control of the display driver integrated circuit 2302.

The system memory 2400 may store data that are used for an operation of the electronic device 2000. For example, the system memory 2400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage device 2500 may store data regardless of whether a power is supplied. For example, the storage device 2500 may include at least one of various nonvolatile memories such as a flash memory, a PRAM, an MRAM, a ReRAM, and a FRAM. For example, the storage device 2500 may include an embedded memory and/or a removable memory of the electronic device 2000.

The audio processor 2600 may process an audio signal by using an audio signal processor 2610. The audio processor 2600 may receive an audio input through a microphone 2620 or may provide an audio output through a speaker 2630. The communication block 2700 may exchange signals with an external device/system through an antenna 2710. A transceiver 2720 and a modulator/demodulator (MODEM) 2730 of the communication block 2700 may process signals exchanged with the external device/system, based on at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID).

The image processor 2800 may receive a light through a lens 2810. An image device 2820 and an image signal processor (ISP) 2830 included in the image processor 2800 may generate image information about an external object, based on a received light. The user interface 2900 may include an interface capable of exchange information with a user, except for the touch panel 2200, the display panel 2300, the audio processor 2600, and the image processor 2800. The user interface 2900 may include a keyboard, a mouse, a printer, a projector, various sensors, a human body communication device, etc.

The electronic device 2000 may further include a power management IC (PMIC) 2010 and a battery 2020. The power management IC 2010 may generate an internal power from a power supplied from the battery 2020, and may provide the internal power to the main processor 2100, the touch panel 2200, the touch driver integrated circuit 2202, the display panel 2300, the display driver integrated circuit 2302, the system memory 2400, the storage device 2500, the audio processor 2600, the communication block 2700, the image processor 2800, and the user interface 2900.

Each of the components of the electronic device 2000 may include a safety monitor SM. Also, the safety monitor SM may be connected with each of channels between the components of the electronic device 2000. The safety monitor SM may detect whether components and channels between the components cause an abnormal operation; when the abnormal operation is detected, the safety monitor SM may send an alerting signal to the main processor 2100. The safety monitor SM may be implemented based on the ISO26262 or the ASIL.

The image device 2820 may include the camera module 1100*b* described with reference to FIGS. 15 and 16. The image device 2820 may include the image sensor 100 described with reference to FIGS. 1 to 14. While dumping electrons accumulated in a photodiode to a floating diffusion node through a transfer gate, the image sensor 1142 may clamp a voltage of the floating diffusion node by applying, not a ground voltage, but a clamp voltage to at least one transistor connected with the floating diffusion node, for example, a dynamic conversion gain transistor, a reset gate transistor, or the dynamic conversion gain transistor and the reset gate transistor. Accordingly, a band noise may be prevented from occurring in image data, or such occurrence may be reduced or minimized, when a strong light is incident.

In some example embodiments, components according to the present inventive concepts are described by using the terms "first", "second", "third", etc. However, the terms "first", "second", "third", etc. may be used to distinguish components from each other and do not limit the present inventive concepts. For example, the terms "first", "second", "third", etc. do not involve an order or a numerical meaning of any form.

In some example embodiments, components according to some example embodiments of the present inventive concepts are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

As described herein, any devices, electronic devices, modules, units, and/or portions thereof according to any of the example embodiments, and/or any portions thereof (including, without limitation, the image sensor 100, the pixel array 110, the row driver 120, the ramp signal generator 130, the timing generator 160, the analog-to-digital conversion circuit 140, the memory circuit 150, the electronic device 1000, the application processor 1200, the image processing device 1210, the image generator 1214, sub image processors 1212*a*, 1212*b*, 1212*c*, the camera module controller 1216, the memory controller 1220, the PMIC 1300, the external memory 1400, the internal memory 1230, the actuator 1130, the image sensing device 1140, the control logic 1144, the image sensor 1142, the memory 1146, the storage 1150, OPFE 1110, the electronic device 2000, the main processor 2100, the touch panel 2200, the touch driver integrated circuit (TDI) 2202, the display panel 2300, the display driver integrated circuit (DDI) 2302, the system memory 2400, the storage device 2500, the audio processor 2600, the communication block 2700, the image processor 2800, the user interface 2900, the PMIC 2010, the battery 2020, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, electronic devices, modules, units, and/or portions thereof according to any of the example embodiments.

Any of the memories described herein, including, without limitation, the internal memory 1230, the external memory 1400, the memory 1146, and/or the storage 1150 may be a non-transitory computer readable medium and may store a program of instructions. Any of the memories described herein may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

According to the present inventive concepts, at least one transistor connected with a floating diffusion node of each pixel is biased by a clamp voltage. When electrons, the amount of which exceeds the bias of the clamp voltage of the at least one transistor, are dumped to the floating diffusion node, the electrons are leaked out through the at least one transistor. Accordingly, image sensors configured to reduce, minimize, or present occurrence of a band noise in image data due to a strong incident light, camera modules including such image sensors, and operating methods of such image sensors are provided.

While the present inventive concepts has been described with reference to some example embodiments thereof, it will be apparent to those of ordinary skill in the art that various changes and modifications may be made thereto without departing from the spirit and scope of the present inventive concepts as set forth in the following claims.

What is claimed is:

1. An image sensor, comprising:
a pixel array including a plurality of pixels, wherein each pixel of the plurality of pixels includes
a photodiode;
a transfer gate transistor between the photodiode and a floating diffusion node, and
a first transistor between the floating diffusion node and a first voltage node, wherein the first voltage node is configured to receive a first voltage;
a row driver connected with rows of the plurality of pixels through row lines, wherein, for each pixel of pixels of a selected row among the rows, the row driver is configured to
apply a second voltage to a gate of the first transistor, and
turn on the transfer gate transistor; and
an analog-to-digital conversion circuit connected with columns of the plurality of pixels through column lines, the analog-to-digital conversion circuit configured to detect pixel values from the pixels of the selected row,
wherein, for each pixel of the pixels of the selected row, the row driver is configured to apply a clamp voltage to the gate of the first transistor while the transfer gate transistor is turned on, wherein the clamp voltage is lower than the second voltage.

2. The image sensor of claim 1, wherein, for each pixel of the pixels of the selected row, the row driver is configured to apply a turn-on voltage to the transfer gate transistor to turn on the transfer gate transistor, wherein the turn-on voltage is higher than the clamp voltage.

3. The image sensor of claim 1, wherein the clamp voltage is higher than a ground voltage.

4. The image sensor of claim 1, wherein the row driver includes:
a first PMOS transistor, including
a gate configured to receive a driving voltage,
a first node configured to receive the second voltage, and
a second node connected with the gate of the first transistor of each pixel of the plurality of pixels;
a first NMOS transistor, including
a gate configured to receive the driving voltage,
a first node connected with the gate of the first transistor of each pixel of the plurality of pixels, and
a second node;
a second NMOS transistor, including
a gate configured to receive a clamp enable signal,
a first node connected with the second node of the first NMOS transistor, and
a second node connected with a ground node; and
a second PMOS transistor, including
a gate configured to receive the clamp enable signal,
a first node configured to receive the clamp voltage, and
a second node connected with the gate of the first transistor of each pixel of the plurality of pixels.

5. The image sensor of claim 1, wherein
each pixel of the plurality of pixels further includes a second transistor between the first transistor and the floating diffusion node,
wherein, for each pixel of the pixels of the selected row, the row driver is configured to:
simultaneously apply the second voltage to the gate of the first transistor and a gate of the second transistor.

6. The image sensor of claim 5, wherein, for each pixel of the pixels of the selected row, the row driver is configured to:
apply a second clamp voltage to the gate of the second transistor while the transfer gate transistor is turned on, wherein the second clamp voltage is lower than the second voltage.

7. The image sensor of claim 6, wherein, for each pixel of the pixels of the selected row, the row driver is configured to:
apply the second clamp voltage to the gate of the second transistor subsequently to applying the clamp voltage to the gate of the first transistor.

8. The image sensor of claim 6, wherein the row driver includes:
a first PMOS transistor, including
a gate configured to receive a driving voltage,
a first node configured to receive the second voltage, and
a second node connected with the gate of the second transistor of each pixel of the plurality of pixels;
a first NMOS transistor, including
a gate configured to receive the driving voltage,
a first node connected with the gate of the second transistor of each pixel of the plurality of pixels, and
a second node;
a second NMOS transistor, including
a gate configured to receive a clamp enable signal,
a first node connected with the second node of the first NMOS transistor, and
a second node connected with a ground node; and
a second PMOS transistor, including
a gate configured to receive the clamp enable signal,
a first node configured to receive the second clamp voltage, and
a second node connected with the gate of the second transistor of each pixel of the plurality of pixels.

9. The image sensor of claim 5, wherein, for each pixel of the pixels of the selected row, the row driver is configured to:
turn on the transfer gate transistor secondly; and
turn on the second transistor based on applying the second voltage to the gate of the second transistor while the transfer gate transistor is secondly turned on.

10. The image sensor of claim 9, wherein, for each pixel of the pixels of the selected row, the row driver is configured to:
apply the clamp voltage to the gate of the first transistor while the transfer gate transistor is secondly turned on.

11. The image sensor of claim 9, wherein, for each pixel of the pixels of the selected row, the row driver is configured to:
apply a ground voltage to the gate of the first transistor while the transfer gate transistor is secondly turned on.

12. The image sensor of claim 9, wherein, for each pixel of the pixels of the selected row, the row driver is configured to:
apply a ground voltage to the gate of the first transistor while the transfer gate transistor is turned on.

13. The image sensor of claim 12, wherein, for each pixel of the pixels of the selected row, the row driver is configured to:
apply a second clamp voltage to the gate of the second transistor while the transfer gate transistor is secondly turned on.

14. The image sensor of claim 12, wherein, for each pixel of the pixels of the selected row, the row driver is configured to:
apply the ground voltage to the gate of the first transistor while the transfer gate transistor is secondly turned on.

15. The image sensor of claim 5, wherein each pixel of the plurality of pixels further includes:
a source follower transistor, including
a gate connected with the floating diffusion node,
a first node connected with the first voltage node, and
a second node; and
a selection gate transistor, including
a gate connected with a corresponding row line among the row lines,
a first node connected with the second node of the source follower transistor, and
a second node connected with a corresponding column line among the column lines.

16. The image sensor of claim 15, wherein each pixel of the plurality of pixels further includes:
a second photodiode;
a second transfer gate transistor connected between the second photodiode and a second floating diffusion node;
a first switch transistor connected with the second floating diffusion node and a node between the first transistor and the second transistor; and
a capacitor connected between the second floating diffusion node and the first voltage node.

17. The image sensor of claim 15, wherein each pixel of the plurality of pixels further includes:
a second photodiode;
a second transfer gate transistor connected between the second photodiode and the floating diffusion node;
a third photodiode;
a third transfer gate transistor connected between the third photodiode and the floating diffusion node;
a fourth photodiode; and
a fourth transfer gate transistor connected between the fourth photodiode and the floating diffusion node.

18. A camera module, comprising:
an image sensor configured to generate image data; and
a logic circuit configured to generate calibrated image data based on calibrating the image data received from the image sensor,
wherein the image sensor includes
a pixel array including a plurality of pixels, wherein each pixel of the plurality of pixels includes
a photodiode,
a transfer gate transistor between the photodiode and a floating diffusion node, and
a first transistor between the floating diffusion node and a first voltage node, wherein the first voltage node is configured to receive a first voltage,
a row driver connected with rows of the plurality of pixels through row lines, wherein, when a readout operation is performed on pixels of a selected row among the rows, for each pixel of the pixels of the selected row among the rows, the row driver is configured to:
apply a second voltage to a gate of the first transistor, and
turn on the transfer gate transistor such that electrons integrated in the photodiode are dumped to the floating diffusion node; and
an analog-to-digital conversion circuit connected with columns of the plurality of pixels through column lines, the analog-to-digital conversion circuit configured to detect pixel values from the pixels of the selected row,
wherein, for each pixel of the pixels of the selected row, the first transistor is configured to be set to a quasi-on state while the transfer gate transistor is turned on.

19. The camera module of claim 18, wherein the first transistor includes a native transistor or a depletion transistor.

20. An operating method of an image sensor which includes a plurality of pixels, the plurality of pixels including rows of pixels, wherein each pixel of the plurality of pixels includes a photodiode, a transfer gate transistor between the photodiode and a floating diffusion node, and a first transistor between the floating diffusion node and a first voltage node, the first voltage node configured to receive a first voltage, the operating method comprising:
for each pixel of pixels belonging to a selected row from among the rows of pixels, applying a second voltage to a gate of the first transistor;
turning on the transfer gate transistor; and
applying a clamp voltage, which is lower than the first voltage and the second voltage and is higher than a ground voltage, to the gate of the first transistor, while the transfer gate transistor is turned on.

* * * * *